US012784410B2

(12) United States Patent
Kastryulin et al.

(10) Patent No.: US 12,784,410 B2
(45) Date of Patent: Nov. 3, 2026

(54) SALIENCY MAPS FOR MEDICAL IMAGING

(71) Applicant: KONINKLIJKE PHILIPS N.V., Eindhoven (NL)

(72) Inventors: Sergey Kastryulin, Moscow (RU); Alexey Chernyavskiy, Moscow (RU); Nicola Pezzotti, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 266 days.

(21) Appl. No.: 18/683,595

(22) PCT Filed: Aug. 11, 2022

(86) PCT No.: PCT/EP2022/072515
§ 371 (c)(1),
(2) Date: Feb. 14, 2024

(87) PCT Pub. No.: WO2023/020924
PCT Pub. Date: Feb. 23, 2023

(65) Prior Publication Data

US 2024/0355094 A1 Oct. 24, 2024

(30) Foreign Application Priority Data

Aug. 20, 2021 (RU) .......................... RU2021124793

(51) Int. Cl.
*G06V 10/774* (2022.01)
*G06T 12/10* (2026.01)
(Continued)

(52) U.S. Cl.
CPC .......... *G06V 10/7715* (2022.01); *G06T 12/10* (2026.01); *G06V 10/235* (2022.01);
(Continued)

(58) Field of Classification Search
CPC ............ G06V 10/7715; G06V 10/235; G06V 10/774; G06V 10/464; G06V 10/993
See application file for complete search history.

(56) References Cited

U.S. PATENT DOCUMENTS

2017/0242481 A1 8/2017 Lu et al.
2018/0268552 A1 9/2018 Wood et al.
(Continued)

OTHER PUBLICATIONS

Gatoula et al. "Enhanced CNN-based gaze estimation on wireless capsule endoscopy images"; 2021 IEEE 34th International Symposium on Computer-Based Medical Systems (CBMS); IEEE, (Year: 2021).*
Zhang et al. "Efficient folded attention for medical image reconstruction and segmentation." Proceedings of the AAAI Conference on Artificial Intelligence; vol. 35. No. 12. (Year: 2021).*
(Continued)

*Primary Examiner* — Sumati Lefkowitz
*Assistant Examiner* — Michael Adam Shariff

(57) ABSTRACT

Disclosed herein is a medical system (100) comprising a memory (110) storing machine executable instructions (120). The memory (110) further stores a trained first machine learning module (122) trained to output in response to receiving a medical image (124) as input a saliency map (126) as output. The saliency map (126) is predictive of a distribution of user attention over the medical image (124). The medical system (100) further comprises a computational system (104). Execution of the machine executable instructions (120) causes the computational system (104) to receive a medical image (124). The medical image (124) is provided as input to the trained first machine learning module (122). In response to the providing of the medical image (124), a saliency map (126) of the medical image (124) is received as output from the trained first machine learning module (122). The saliency map (126) predicts a distribution of user attention over the medical image (124). The saliency map (126) of the medical image (124) is provided.

13 Claims, 18 Drawing Sheets

(51) Int. Cl.

| | |
|---|---|
| ***G06V 10/22*** | (2022.01) |
| ***G06V 10/46*** | (2022.01) |
| ***G06V 10/77*** | (2022.01) |
| ***G06V 10/98*** | (2022.01) |

(52) U.S. Cl.
CPC .......... *G06V 10/464* (2022.01); *G06V 10/774* (2022.01); *G06V 10/993* (2022.01); *G06V 2201/03* (2022.01)

(56) References Cited

U.S. PATENT DOCUMENTS

| | | | |
|---|---|---|---|
| 2018/0349698 | A1 | 12/2018 | Gustafsson et al. |
| 2021/0192263 | A1 | 6/2021 | Declerck et al. |
| 2023/0377314 | A1 | 11/2023 | Pezzotti et al. |
| 2023/0394652 | A1 | 12/2023 | Pezzotti et al. |

OTHER PUBLICATIONS

Gatoula Panagiota et al: "Enhanced CNN-Based Gaze Estimation on Wireless Capsule Endoscopy Images", 2021 IEEE 34th International Symposium on Computer-Based Medical Systems (CBMS), IEEE, Jun. 7, 2021 (Jun. 7, 2021), pp. 189-195.

Zhang Hang et al: "Efficient Folded Attention for 3D Medical Image Reconstruction and Segmentation" 35-th AAAI Conference on Artificial Intelligence (AAAI-21), May 18, 2021 (May 18, 2021), pp. 10868-10876.

International Search Report and Written Opinion from PCT/EP2022/072515 mailed Nov. 30, 2022.

Alzubaidi et al."What Catches a Radiologist's Eye . . . " Proceedings of SPIE 7624m Medical Imaging 2020.

Ferreira et al "Saliency Driven System with Deep Learning for Cell Image Classification" 2019 IEEE 16th Int. Symposium on Biomedical Imaging Apr. 8-11, 2019.

* cited by examiner

SALIENCY MAPS FOR MEDICAL IMAGING

CROSS REFERENCE TO RELATED APPLICATIONS

This application is a U.S. national phase application of International Application No. PCT/EP2022/072515 filed Aug. 11, 2022, which claims the benefit of RU application Ser. No. 20/211,24793 filed Aug. 20, 2021 and is incorporated herein by reference.

FIELD OF THE INVENTION

The invention relates to medical imaging, in particular to saliency maps for medical imaging.

BACKGROUND OF THE INVENTION

Image reconstruction is one of the fundamental components of medical imaging. Its main objective is to provide high-quality medical images for clinical usage. Historically, this goal is achieved with different kinds of reconstruction algorithms. Such algorithms, e.g., SENSE and Compressed-SENSE in magnetic resonance imaging (MRI), are mostly based on expert knowledge or hypotheses about the properties of the images that are reconstructed. Recently, data-driven approaches based on machine learning have been added to enhance the quality of reconstructions. Such data-driven approaches based on machine learning are more and more reducing the dependence of image reconstruction on expert knowledge or hypotheses about the properties of the images. Data-driven approaches may even push the image reconstruction to the extreme, where the models used for image reconstruction are mostly based on machine learning with minimal reliance on parameters set by experts.

SUMMARY OF THE INVENTION

The invention provides for a medical system, a computer program and a method in the independent claims. Embodiments are given in the dependent claims.

It is suggested to provide a machine learning module trained to provide a saliency map predicting a distribution of user attention over a medical image. The saliency map may identify regions of high interest within the medical image, i.e., regions for which a high user attention is predicted. This distribution of user attention may be used for weighting a relevance of different regions within the medical image differently. Thus, regions-of-interest with a higher relevance than other regions may be identified and/or selected. The higher a level of user attention predicted for a specific region, the higher the relevance of this region may be. Depending on the predicted relevance, different regions may be taken into account differently, e.g., for image reconstruction and/or image analysis. For example, a method of image reconstruction may be selected based on the predicted user attention. The selected method may, e.g., be a method most suited to provide a high quality of image reconstruction for anatomical structures comprised by regions with a high predicted user attention.

For example, a quality assessment assessing image quality of reconstructed medical images, i.e., the quality of image reconstruction, may be weighted using the distribution of user attention. Thus, reconstruction errors may be identified and/or assessed based on their relevance. A reconstruction error in a region with a higher relevance may be considered to be more relevant than a similar reconstruction error in a region with a lower relevance. For example, the saliency map may be used for weighting out-of-distribution (OOD) maps and/or resulting out-of-distribution (OOD) scores defining uncertainties of medical images.

For example, the saliency map predicting the user attention may be used to weight an output of a machine learning module during training of the module for reconstructing medical images. Thus, the focus of the training of the machine learning module may be increased on regions of the reconstructed images with a higher relevance according to the predicted user attention.

Training saliency maps for training a machine learning module to predict saliency maps of given medical images may be generated using eye tracking of users reading training medical images. The machine learning module may, e.g., be trained for predicting personalized saliency maps with personalized distributions of user attention for an individual user. Thus, a personalized weighting using personalized saliency maps predicting personalized distribution of user attention may be implemented.

In one aspect the invention provides for a medical system. The medical system comprises a memory storing machine executable instructions. The memory further stores a trained first machine learning module trained to output in response to receiving a medical image as input a saliency map as output. The saliency map is predictive of a distribution of user attention over the medical image. The medical system further comprises a computational system. Execution of the machine executable instructions causes the computational system to receive a medical image. Execution of the machine executable instructions further causes the computational system to provide the medical image as input to the trained first machine learning module. In response to the providing of the medical image, execution of the machine executable instructions further causes the computational system to receive a saliency map of the medical image as output from the trained first machine learning module. The saliency map predicts a distribution of user attention over the medical image. Execution of the machine executable instructions further causes the computational system to provide the saliency map of the medical image.

The saliency map predicting a distribution of user attention may be generated by a trained machine learning module, e.g., a machine learning module trained using a deep learning approach. The machine learning module may, e.g., comprise a neural network. The neural network may, e.g., be a U-Net neural network.

Using the trained first machine learning module to output in response to receiving a medical image as input a saliency map as output may be part of a test phase in order to test the trained first machine learning module. Using the trained first machine learning module to output in response to receiving a medical image as input a saliency map as output may be part of a prediction phase in order to predict a saliency map for the medical image received using the trained first machine learning module.

Machine learning based reconstruction methods are becoming increasingly important in medical imaging. Known image reconstruction approaches in general have a tendency to treat different regions of an image to be reconstructed to be equally important. Such an assumption may make perfect sense when images in general are considered. Each region of an image may contribute to an overall perception of the image more or less equally. However, in case of medical images, specialists tend to examine particular regions showing specific anatomical structures of interest more attentively than other regions. Experts may carefully select important regions, i.e., regions-of-high interest, looking for particular details shown therein. Such details may be necessary, even essential for making a correct diagnostic and/or operational decision.

Using a saliency map predicting a distribution of user attention may have the advantage of integrating such important information. The predicted distribution of user attention may be used to determine the relevance of different regions of a medical image, thus bridging a huge gap towards reliable intellectual systems taken into account different levels of relevance of different regions of medical images. Using such saliency maps may allow to take into account the receiver of reconstructed medical images and their needs, even in case of data-driven reconstruction approaches.

It is proposed to provide for a machine learning module, i.e., an algorithm based on machine learning (ML), e.g., deep learning (DL), that is configured to identify salient regions in 2D and/or 3D medical images, i.e., 2D and/or 3D still medical images, and to provide saliency maps predicting distributions of user attention over the 2D and/or 3D medical images. As an input for the machine learning module a 2D or 3D medical image may be provided. For example, an additional context for the input medical image may be provided. Such a context may, e.g., identify a task for which the respective image is used, like a measurement of a specific organ, a detection of a tumor or a lesion, and/or a context may, e.g., identify an imaging method used for acquiring imaging data, like magnetic resonance imaging (MRI), computed-tomography (CT) imaging, or advanced molecular imaging (AMI), e.g., positron emission tomography (PET) or single photon emission computed tomography (SPECT). Such a trained machine learning module, i.e., a trained saliency maps estimation module, may be applied in different ways.

A trainable machine learning module may be provided that incorporates information about an expert's attention on different regions of examined 2D and/or 3D medical images. With this module at hand, saliency maps predicting distributions of user attention over medical images may be provided, which may help to provide improved medical images. Improved medical images may be provided, e.g., by selecting more suitable reconstruction methods, that better meet an expert's need. Thus, an approach for a personalized selection of reconstruction methods or for a personalization of a machine learning module for image reconstruction may be provided.

Herein, a saliency map is considered as a map describing a distribution of user attention over a medical image. The level of user attention may provide a weighting factor for weighting different regions of the medical image differently such that the weighting may capture how clinically relevant the different regions of the medical image are. Differently weighted image regions may be treated differently in image reconstruction and/or image analysis.

Training saliency maps for training a machine learning module to predict saliency maps for given medical images may be obtained by capturing the behavior of a user, e.g., a radiologist or a scanner technician, while studying medical images. For example, using eye-tracking technology, a model of gaze direction and fixation patterns may be obtained, identifying where the user is looking at in a medical image being displayed. Alternatively and/or additionally, other user interactions with a medical image being displayed may be taken into account to determine a distribution of levels of user attention over the medical image. For example, a selection of specific regions of the medical image, a zooming into specific regions of the medical image, a processing of specific regions of the medical image and/or positions and movements of a curser controlled by the user within the medical image may be taken into account. A machine training module may be trained to predict saliency map as an output for a medical image received as an input.

Known image reconstruction models may treat all areas of an image to be reconstructed, in particular of a medical image, identically. Saliency maps predicting distributions of user attention may be integrated during training, such that a resulting loss function for a specific region within a medical image reconstructed by a machine learning module is weighted according to an importance of the respective region to the human observer. This, importance of the respective region to the human observer may be predicted by a saliency map. This approach may enable developing reconstruction modules that downweight image quality in non-relevant regions, in the background and of anatomical features comprised by a medical image to be reconstructed that are less important for a current clinical task. In exchange, image quality of more relevant regions and anatomical features comprised by a medical image to be reconstructed on the other hand may be increased. Thus, an increase of image quality of specific regions based on information provided by saliency maps may be done in exchange with the downweighting image quality in some other, less important regions. Such an exchange of quality may be especially valuable in accelerated MRI, because of the comparable small amount of information, i.e., imaging data, is acquired.

The distribution of user attention predicted by the saliency map may thus represent a distribution of levels of interest. The higher the predicted user attention for a specific region of a medical image is, the higher a level of interest of respective image regions. A region of high user attention may be considered to be a region of high interest and thus of high relevance.

The medical image may be a tomographic image, e.g., a magnetic resonance (MR) images or a computed-tomography (CT) image. The medical image may be generated using an advanced molecular imaging (AMI) method, e.g., positron emission tomography (PET) or single photon emission computed tomography (SPECT).

The trained first machine learning module may be trained by the same medical system using the trained first machine learning module output saliency maps. Additionally or alternatively, the trained first machine learning module may be trained by another medical system different from the medical system using the trained first machine learning module saliency map to output saliency maps.

For example, execution of the machine executable instructions further causes the computational system to provide the trained first machine learning module. The providing of the trained first machine learning module comprises providing the first machine learning module. First training data comprising first pairs of training medical images and training saliency maps are provided. The training salient maps are descriptive of distributions of user attention over the training medical images. The first machine learning module is trained using the first training data. The resulting trained first machine learning module is trained to output the training saliency maps of the first pairs in response to receiving the training medical images of the first pairs.

To train the machine learning module for predicting saliency maps, a dataset providing training data may be collected. The training data may comprise pairs of training medical images and training saliency maps describing distributions of user attention of the respective training medical images. For collecting such training saliency maps, a set of training medical images may be provided. The training medical images may be displayed on a display device. An eye tracking device, like a camera, may be placed in front of a user, e.g., a radiologist working with the training medical images, which are displayed on the display device, e.g., a computer screen. The eye tracking device may, e.g., be arranged on, below or near the display device. The training medical images may, e.g., be medical images from a specific domain of interest, for instance MRI or CT. The training medical images may for example be clinical images with which the user, e.g., a radiologist is working. Recordings of eye positions and/or movements from the eye tracking device, like a camera, may be used to track eye movements and match them with positions within the displayed medical images that were examined during the recording. Tracking and matching of eye positions and movements may, e.g., be performed using an attention determining module. The attention determining module may be configured for determining a distribution of user attention over a displayed training medical image using the eye tracking device to determine for the user of the medical system looking at the displayed training medical image points of attention within the displayed training medical image. The longer and/or the more often a user looks at a specific point of the displayed training medical image, the higher the level of user attention assigned to this point may be.

For example, the medical system further comprises a display device. The providing of the first training data comprises for each of the training medical images of the first training data:

- displaying the respective training medical image using the display device;
- measuring a distribution of user attention over the displayed training medical image;
- generating the training saliency map of the first pair of training data comprising the displayed training medical image using the measured distribution of user attention over the training medical image.

For example, the medical system further comprises an eye tracking device configured for measuring positions and movements of eyes of a user of the medical system. The memory further stores an attention determining module configured for determining the distribution of user attention over the displayed training medical image using the eye tracking device to determine for the user of the medical system looking at the displayed training medical image points of attention within the displayed training medical image.

For example, from camera-tracking of a user's eyes, e.g., a radiologist's eyes, training distributions of user attentions provided by training saliency maps may be provided for different types of medical images used as training medical images.

For example, the trained first machine learning module is trained to output in response to receiving a medical image as input a user individual saliency map predicting a user individual distribution of user attention over the input medical image. Examples may allow for providing user individual saliency maps. The trained machine learning module may be trained for a specific user, e.g., using training saliency maps generated by determine levels of user attention of this specific user only. For example, a plurality of machine learning modules may be provided, each being trained for and assigned to another user of a plurality of users. Depending on which user is using the medical system, e.g., which user is locked-in, a machine learning module of the plurality of machine learning modules may be selected to predict saliency maps. For example, a machine learning module assigned to the user using the medical system may be selected.

The saliency map may be provided for usage within a medical imaging reconstruction chain, i.e., for selection of image reconstruction methods, for improving image reconstructions methods and/or for assessing image reconstruction methods, in particular image reconstructions methods executed using machine learning modules for image reconstruction.

For example, the medical system is further configured to select a reconstruction method for reconstructing medical images from a plurality of pre-defined reconstruction methods using the saliency map. The medical image is a test medical image of a pre-defined type of anatomical structure for which a medical image is to be reconstructed. A plurality of test maps is provided. Each of the test maps is assigned to a different one of the reconstruction methods. Each of the test maps identifies sections of the test image comprising anatomical sub-structures of the pre-defined type of anatomical structure for which a quality of image reconstruction is the highest compared to other anatomical sub-structures of the pre-defined type of anatomical structure, when using the assigned reconstruction method. Execution of the machine executable instructions further causes the computational system to:

- provide the test maps;
- compare the test maps with the saliency map;
- determine one of the test maps having a highest level of structural similarity with the saliency map;
- select the reconstruction method assigned to the determined test map;
- reconstruct the medical image to be reconstructed using the selected reconstruction method.

For example, the trained machine learning module, i.e., saliency map estimation module. may be used as a tool for selecting a reconstruction method. For example, a reconstruction method may be selected that works best for a particular purpose and/or for a particular user working with the medical images. Different reconstruction methods may, e.g., refer to different methods for reconstructing a medical image from a given set of acquired medical imaging data. Different reconstruction methods may e.g., in addition refer to different methods for acquiring the medical imaging data used for reconstructing the medical image, e.g., using different sampling pattern. Different methods for acquiring the medical imaging data may, e.g., even refer to using different medical imaging systems for data acquisition, like MRI systems, CT imaging systems, PET imaging systems, or SPECT imaging systems.

The trained machine learning module may be used to select a reconstruction method that best serves the interests of a user. By providing a saliency map that predicts a distribution of user attention, the trained machine learning provides an approach taking into account a user related measure of relevance. In this setting, multiple reconstruction methods with comparable characteristics may be deployed. For example, a specific anatomical structure should be depicted. Comparable characteristics may refer to the fact that all the reconstruction methods are able to provide reconstructed medical images depicting the respective anatomical structure. The reconstruction method most suitable for the user may be chosen based on the prediction of user attention provided by the saliency map. The saliency map may, e.g., predict a distribution of user attention for an individual user. Thus, for different users different saliency maps may be predicted, depending on user's experience, references and/or way of working. Different radiologists may examine images in different ways. Hence, each of them may benefit from reconstructions which best meet their individual needs.

Each of the reconstruction method may be designed to deal with particular characteristic of the input data, i.e., of the acquired medical data used for reconstructing the medical image. For example, in MRI, some reconstruction methods may produce medical images having a high contrast between white and gray matter in the brain, while others may provide better signal-to-noise ratio in regions near the skull. For each reconstruction method a test map may be provided identifying sections of a test image for which a quality of image reconstruction of the respective reconstruction method is the highest. For example, in case of a reconstruction method providing high image quality for white matter in the brain a test map may be provided highlighting white matter comprised by the test image. For example, in case of a reconstruction method providing high image quality for grey matter in the brain a test map may be provided highlighting grey matter comprised by the test image. For example, in case of a reconstruction method providing high image quality for cerebrospinal fluid in the brain a test map may be provided highlighting cerebrospinal fluid comprised by the test image. The test maps may have saliency map-like appearance. The test maps may be compared with the saliency map provided by the machine learning, that, e.g., is configured to predict a particular radiologists' distribution of attention over the test image. The most suitable reconstruction method, i.e., the reconstruction method for which the test map displays a highest level of similarity with the saliency map is chosen. The level of similarity may be determined estimating a distance between the saliency map obtained for the radiologist and each of the test maps provided for the different reconstruction methods.

A saliency map predicting a distribution of user attention, e.g., for a specific user, over a test image may be provided. The test image may be representative for a specific type of image to be reconstructed. The information provided by the saliency map regarding a probable distribution of user attention may be used to select a most appropriate one of the reconstruction models available. Various reconstruction models may work differently on different regions of a medical image to be reconstructed. Saliency maps predicting user attention may help to select a model that better reconstructs regions that tend to be in the focus of user attention, i.e., be more valuable for a particular expert in a given context, than other regions of the medical image to be reconstructed.

For training a machine learning model to predict user attention, a camera may, e.g., be placed in front of an expert to track eye movements and/or positions in order to identify regions of a template medical image, which are in the focus of attention by the respective expert.

For example, the memory further stores an out-of-distribution estimation module configured for outputting an out-of-distribution map in response to receiving a medical image as input. The out-of-distribution map represents levels of compliance of the input medical image with a reference distribution defined by a set of reference medical images. Execution of the machine executable instructions further causes the computational system to provide the medical image as input to the out-of-distribution estimation module. In response to the providing of the medical image, execution of the machine executable instructions further causes the computational system to receive an out-of-distribution map of the medical image as output from the out-of-distribution estimation module. The out-of-distribution map represents levels of compliance of the medical image with the predefined distribution. Execution of the machine executable instructions further causes the computational system to provide a weighted out-of-distribution map. The providing of the weighted out-of-distribution map comprises weighting the levels of compliance represented by the out-of-distribution map using the distribution of user attention over the medical image predicted by the saliency map.

Saliency maps predicting distributions of user attention over medical images may, e.g., be combined with uncertainty estimation maps, like out-of-distribution (OOD) maps, for a more reliable detection of regions of medical image, which are most likely comprising reconstruction artefacts. Saliency maps may allow to weight regions of OOD maps. Weighted OOD maps may be less precise, because they downweight or even zero-out regions, where fake or erased anatomies may occur. However. this information may becomes more valuable for the end user, because weighted OOD maps allows to focus only on regions, which are important for the user. According to examples, also the set of reference medical images may be provided to the out-of-distribution estimation module for calculating ODD maps. In case of a trained out-of-distribution estimation module, training medical images and assigned training OOD maps may be used for training the out-of-distribution estimation module to provide OOD maps.

For example, in case a machine learning module is used for reconstructing medical images from medical imaging data, for medical imaging data that is too dissimilar from training medical imaging data used to train the respective machine learning module there may be no guarantee that accurate results, i.e., accurately reconstructed medical images, are provided. Thus, if data being input into a trained machine learning module is outside of a training data distribution then the reconstructed medical image which is produced using the trained machine learning module may be incorrect. The resulting reconstructed medical image may even look like a correct medical image, but it is not correct. A reconstructed medical image that is too dissimilar from a set of reference medical images, e.g., training medical images used for training a machine learning module providing the reconstructed medical image, may be considered to be "out-of-distribution" in view of a reference distribution defined by a set of reference medical images. The degree of similarity, i.e., the level of compliance, may, e.g., be determined per pixel or voxel.

The out-of-distribution estimation module may be configured or trained for outputting an out-of-distribution map. An out-of-distribution estimation module, as used herein, encompasses a software module that may, e.g., be used to detect if a reconstructed medial image is within a distribution of training medical images or not. The level of compliance may be descriptive of a probability that the reconstructed medical image or a region of the reconstructed medical image is within the distribution of training medical images.

An out-of-distribution estimation module provided in form of a trained machine learning module may, e.g., comprise an out-of-distribution estimation neural network or a set of neural networks. The out-of-distribution estimation neural network is a neural network, e.g., a classifier network configured for receiving a medical image and providing a classification map of this medical image in form of the out-of-distribution map as an output. The out-of-distribution map represents levels of compliance of the input medical image with a reference distribution defined by a set of reference medical images. The set of reference medical images may, e.g., be a set of training medical images used for training a further machine learning module to reconstruct medical image. The medical image for which the out-of-distribution map is generated may be reconstructed by said further machine learning module. The out-of-distribution map may indicate a distribution of probability over the respective medical image that sections of the medical image are within the reference distribution defined by a set of reference medical images, e.g., a set of training medical images, for those sections.

Out-of-distribution (OOD) estimation methods may be used to estimate an uncertainty and thus reliability of an image reconstruction result, i.e., a reconstructed image. OOD estimation methods may be beneficial for identifying regions of a reconstructed image, which are most likely to comprise reconstruction artefacts. Such methods usually assume that all areas of a reconstructed image are equally relevant. However, in practice and especially in clinically practice that may generally not be the case. An anatomical structure illustrated by a medical image may comprise anatomical sub-structures and/or features, which are of essential for diagnosis. But at the same time such an anatomical structure may comprise anatomical sub-structures and/or features, which are less important or even negligible for diagnosis.

This mixture of more and less relevant regions comprised by a medical image, may lead to false predictions. For example, a false negative prediction may arise, if OOD scores for regions which are more relevant, i.e., more important for a specialist, are low compared with other less relevant regions. but the uncertainties indicated by the respective OOD scores are still high enough to produce mistakes. False positive prediction may arise, if high OOD scores indicative for high uncertainties may signal that there may be a problem in some region, which, however, is completely irrelevant for a specialist performing an examination. Both cases may be avoided by constructing meaningful and reliable saliency maps used for weighting OOD results. A weighted uncertainty map may be presented to a user, e.g., for warning.

For example, saliency maps predicting distributions of user attention over medical images may be combined with uncertainty maps, e.g., OOD maps providing a measure for reconstruction uncertainties of reconstructed medical images. For example, uncertainties of images reconstructed using a reconstruction neural network may not be equally important for different regions of an examined image. For example, a medical image with low uncertainties in relevant regions and high levels of uncertainty in less or even irrelevant regions may be more reliable for a user than a medical image with medium levels of uncertainty in relevant regions and low levels of uncertainties in less or even irrelevant regions.

Using a saliency map for weighting the levels of uncertainties of different regions may enable for providing an estimate of levels of uncertainties which is more reliable. Such an estimate may take into account different levels of relevance for different regions of the medical image based on a prediction of user attention provided by the saliency map. If a user is predicted to pay more attention to a specific region, then the uncertainty level for this region may be weighted higher than a corresponding level for a less salient region. In one example, weighted uncertainty maps, e.g., OOD maps, may be displayed for the user on a display device of the medical system. Such a weighted uncertainty map may illustrate a distribution of levels of uncertainty over a reconstructed medical image with the levels of uncertainty being weighted based on the relevance of the region to which the reactive levels are assigned. In a further example, the weighted uncertainty map may be reduced to a scalar value, e.g., by averaging. This scalar value may be used to assess an overall reliability of the reconstructed image. Based on this assessment, a decision may be made, e.g., to re-acquire the imaging data used for reconstructing the medical image or, e.g., to warn the user directly about potential problems in the provided image. For example, in case the scalar value exceeds a pre-defined threshold, a signal recommending a re-acquisition of imaging data may be issued and/or a re-acquisition of imaging data may be initiated. For example, in case the scalar value exceeds a pre-defined threshold, a signal waring the user about a potentially insufficient reliability of the reconstructed image may be issued.

For example, the providing of the weighted out-of-distribution map further comprises calculating an out-of-distribution score using the weighted levels of compliance provided by the weighted out-of-distribution map. The out-of-distribution score is descriptive of a probability that the medical image as a whole is within the reference distribution.

An aggregated OOD score of a weighted OOD map may be presented to a user, e.g., for warning. Additionally or alternatively, an aggregated OOD score may be presented to the user or be used by another automated system, e.g., to make a decision to discard/re-scan a target subject. The aggregated OOD score may, e.g., be calculated by averaging the levels of compliance, i.e., the local OOD scores, comprised by the weighted OOD map.

For example, the memory further stores an image quality assessment module configured for outputting an image quality map in response to receiving a medical image and a saliency map as input. The image quality map represents a distribution of levels of image quality over the input medical image weighted using the distribution of user attention over the input medical image predicted by the input saliency map. Execution of the machine executable instructions further causes the computational system to provide the medical image and the saliency map as input to the image quality assessment module. In response to the providing of the medical image and the saliency map, execution of the machine executable instructions further causes the computational system to receive an image quality map as output from the image quality assessment module. The image quality map represents a distribution of distribution of levels of image quality over the medical image weighted using the distribution of user attention over the medical image predicted by the saliency map. Execution of the machine executable instructions further causes the computational system to provide the received image quality map.

Saliency maps predicting distributions of user attention over medical images may be used to enhance image quality assessment metrics that, e.g., may be applied during training and/or evaluation of medical image reconstruction modules, like deep learning-based reconstruction modules. Saliency maps may significantly enhance the informative value of image quality assessment metrics currently used, e.g., Mean Squared Error (MSE), Peak Signal-to-Noise Ratio (PSNR), or Structural Similarity Index Measure (SSIM). With such an improvement, better-quality reconstruction modules may be trained and deployed for reconstructing medical images.

Using personalized user individual saliency maps, personalized reconstruction modules may be trained and deployed for reconstructing medical images that are optimized for an individual user.

In addition to the medical image and the saliency map, the image quality assessment module may be provided with an expected medical image. The levels of image quality may provide a measure of how well the medical image matches the expected medical image. The levels of image quality may quantify a degree of similarity between the medical image assessed and the expected medical image. The higher the degree of similarity, the lager the image quality may be. When the image quality assessment module is used for training a medical image reconstruction module, the reference medical image may, e.g., be a training medical image which the medical reconstruction module should be trained to predict.

Researchers spend a lot of time and resources on building new state-of-the-art algorithms for medical image reconstruction. During the process of designing such algorithms, the respective algorithms need to be evaluated multiple times. For example, in case of training machine learning modules to reconstruct medical images, the quality of medical images reconstructed by the machine learning modules being trained may have to be evaluated. For evaluating a prediction of a machine learning module, a loss function is used. Such a loss function is a measure of how accurately a machine learning module is able to predict the expected outcome, i.e., a ground truth. In case of an image reconstruction, a ground truth may, e.g., be provided in form of a training image to be reconstructed. The loss function compares an actual output of the machine learning module, e.g., a reconstructed medical image, with an expected or target output, e.g., a target medical image to be reconstructed. The result of the loss function is referred to as the loss, which is a measure of how well the actual output of a machine learning module matches an expected output. A high value for the loss indicates low performance of the machine learning module, while a low value indicates a high performance.

A loss function for assessing image quality may use an image quality (IQ) assessment metric, e.g., a Mean Squared Error (MSE), a Peak Signal-to-Noise Ratio (PSNR), a Structural Similarity Index Measure (SSIM), a Blind/Referenceless Image Spatial Quality Evaluator (BRISQUE), a Gradient Magnitude Similarity Deviation (GMSD), or a Feature Similarity Index Measure (FSIM). However, none of these metrics is correlated with a notion of quality that may be task-, modality-, and/or person-specific. Therefore, in order to assess image quality more reliably, application specialists are need to be involved. Using saliency maps which help to weight IQ metrics according to some learned expert's perceptual sense of importance, may have the advantage of being able to significantly increase the quality of IQ metrics and simplify experimentation processes. For example, no specialists may be required for assessing image quality anymore. Thus, human-in-the-loop as well as resulting complications for experimentation processes may be avoided.

For example, saliency maps predicting user attention may be used to improve IQ assessment metrics that are used for training and validation of machine learning modules used for image reconstruction. Different regions of a reconstructed medical image may play significantly different roles for user and may thus be of significantly different relevance for a user. Using saliency maps may enable increasing the performance of IQ metrics by weighting reconstruction errors non-uniformly, but rather depending on the relevance of the regions of the reconstructed image, in which the respective errors occur. Thus, the network being trained may be penalized more for errors occurring in more important regions and less for errors occurring in less important regions of an image being reconstructed.

For example, the image quality assessment module is used for training a second machine learning module to output in response to receiving medical imaging data as input a medical image as output. The image quality estimated by the image quality assessment module is descriptive of losses of the output medical image of the second machine learning module relative to one or more reference medical images. Execution of the machine executable instructions further causes the computational system to provide the second machine learning module. Execution of the machine executable instructions further causes the computational system to provide second training data for training the second machine learning module. The second training data comprises second pairs of training medical imaging data and training medical images reconstructed using the training medical imaging data.

Execution of the machine executable instructions further causes the computational system to train the second machine learning module. The second machine learning module is trained to output the training medical images of the second pairs in response to receiving the training medical imaging data of the second pairs. The training comprises for each of the second pairs providing the respective training medical imaging data as input to the second machine learning module and receiving a preliminary medical image as output. The received preliminary medical image is the medical image.

The distribution of image quality represented by the image quality map received for the medical image from the image quality assessment module is used as a distribution of losses over the medical image relative to the training medical image of the respective second pair provided as a reference medical image to the image quality assessment module for determining the received image quality map. Parameters of the second machine learning module are adjusted during the training until the losses over the medical image satisfy a predefined criterion.

A way to modify image quality assessment metrics by incorporating saliency maps predictive of distributions of user attention may be provided to boost performance of metrics as evaluation methods for training machine learning modules for medical image reconstruction. The criterion may, e.g., require that the losses are smaller than a predefined threshold.

The medical system may be configured for image reconstruction. For this purpose, the medical system may provide the second machine learning module. The second machine learning module may be trained for reconstructing medical images, i.e., as an image reconstruction module. The medical image may be a tomographic image, e.g., a magnetic resonance images or a computed-tomography image. The medical image may be generated using an advanced molecular imaging method, e.g., positron emission tomography or single photon emission computed tomography.

On the basis of the saliency map image reconstruction may be adapted. For example, when employing a machine learning module for reconstructing medical images, weights may be adapted driven by the saliency map. The machine learning module for reconstructing medical image may comprise a neutral network, wherein during training weights in the neural network may be adapted driven by the saliency map. For example, the saliency map with the predicted distribution of user attention may be used for adapting image reconstruction, e.g., when employing a deep learning reconstruction approach.

The saliency map is predictive of a distribution of user attention over the medical image. The distribution of user attention may represent a distribution of levels of interest over the medical image. On the basis of the saliency map parameters of the image reconstructing module may be adapted. Thus, the saliency map may be used to steer the image reconstruction module. For example, the image reconstructing module may comprise a neural network being trained employing a deep learning reconstruction approach for adapting weights in the neural network driven by the saliency map. The saliency itself may be generated using deep learning as well, e.g., using eye-tracking to determining user attention for medical images of different types of anatomical structure. By weighting the image reconstruction using the distribution of user attention as predicted by the saliency map may have the beneficial effect of directing accurate reconstruction efforts more to clinically interesting portions or aspect of the medical image to be reconstructed. Clinical interest may be determined by user attention of a user of the medical system.

For example, providing of the received image quality map comprises calculating an image quality score using the received image quality map. The image quality score is descriptive of an averaged image quality of the medical image.

For example, the medical system is configured to acquire medical imaging data for reconstructing the medical image. The medical imaging data is acquired using any one of the following data acquisition methods: magnetic resonance imaging, computed-tomography imaging, positron emission tomography imaging, single photon emission computed tomography imaging.

In another aspect the invention provides for a medical system comprising a memory storing machine executable instructions and a computational system. Execution of the machine executable instructions causes the computational system to provide a trained machine learning module trained to output in response to receiving a medical image as input a saliency map as output. The saliency map is predictive of a distribution of user attention over the medical image. The providing of the trained machine learning module comprises providing the machine learning module. Furthermore, training data is provided comprising pairs of training medical images and training saliency maps. The training salient maps are descriptive of distributions of user attention over the training medical images. The machine learning module is trained using the training data. The resulting trained machine learning module is trained to output the training saliency maps of the pairs in response to receiving the training medical images of the pairs.

The medical system may provide the trained machine learning module for outputting in response to receiving a medical image as input a saliency map as output, which is predictive of a distribution of user attention over the medical image. The medical system may use the trained machine learning module on its own. Additionally or alternatively, the medical system may provide the trained machine learning module for usage to another medical system. For example, the medical system may send the trained machine learning module to the other medical system.

Using the trained machine learning module may comprise providing a medical image as input to the trained machine learning module. In response to the providing of the medical image, a saliency map of the medical image is received as output from the trained machine learning module. The saliency map predicts a distribution of user attention over the medical image. The received saliency map of the medical image may be provided for further use.

In another aspect the invention provides for a computer program comprising machine executable instructions for execution by a computational system controlling a medical system. The computer program further comprises a trained machine learning module trained to output in response to receiving a medical image as input a saliency map as output. The saliency map is predictive of a distribution of user attention over the medical image. Execution of the machine executable instructions causes the computational system to receive a medical image. The medical image is provided as input to the trained machine learning module. In response to the providing of the medical image, a saliency map of the medical image is received as output from the trained machine learning module. The saliency map predicts a distribution of user attention over the medical image. The saliency map of the medical image is provided.

In another aspect the invention provides for a computer program comprising machine executable instructions for execution by a computational system controlling a medical system. Execution of the machine executable instructions causes the computational system to provide a trained machine learning module trained to output in response to receiving a medical image as input a saliency map as output. The saliency map is predictive of a distribution of user attention over the medical image. The providing of the trained machine learning module comprises providing the machine learning module. Furthermore, training data is provided comprising pairs of training medical images and training saliency maps. The training salient maps are descriptive of distributions of user attention over the training medical images. The machine learning module is trained using the training data. The resulting trained machine learning module is trained to output the training saliency maps of the first pairs in response to receiving the training medical images of the first pairs.

The trained machine learning module may be used by the same medical system, which trained the trained machine learning module. Additionally or alternatively, the trained machine learning module may be provided for usage to another medical system. For example, the trained machine learning module may be sent to the other medical system.

Using the trained machine learning module may comprise providing a medical image as input to the trained machine learning module. In response to the providing of the medical image, a saliency map of the medical image is received as output from the trained machine learning module. The saliency map predicts a distribution of user attention over the medical image. The received saliency map of the medical image may be provided for further use.

In another aspect the invention provides for a method of medical imaging using a trained machine learning module trained to output in response to receiving a medical image as input a saliency map as output. The saliency map is predictive of a distribution of user attention over the medical image. The method comprises receiving a medical image. The medical image is provided as input to the trained machine learning module. In response to the providing of the medical image, a saliency map of the medical image is received as output from the trained machine learning module. The saliency map predicts a distribution of user attention over the medical image. The saliency map of the medical image is provided.

In another aspect the invention provides for a method of providing a trained machine learning module trained to output in response to receiving a medical image as input a saliency map as output. The saliency map is predictive of a distribution of user attention over the medical image. The providing of the trained machine learning module comprises providing the machine learning module. Furthermore, training data is provided comprising pairs of training medical images and training saliency maps. The training salient maps are descriptive of distributions of user attention over the training medical images. The machine learning module is trained using the training data. The resulting trained machine learning module is trained to output the training saliency maps of the first pairs in response to receiving the training medical images of the first pairs.

The trained machine learning module may be used by the same medical system, which trained the trained machine learning module. Additionally or alternatively, the trained machine learning module may be provided for usage to another medical system. For example, the trained machine learning module may be sent to the other medical system.

Using the trained machine learning module may comprise providing a medical image as input to the trained machine learning module. In response to the providing of the medical image, a saliency map of the medical image is received as output from the trained machine learning module. The saliency map predicts a distribution of user attention over the medical image. The received saliency map of the medical image may be provided for further use.

It is understood that one or more of the aforementioned examples may be combined as long as the combined examples are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor or computational system of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the computational system of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the computational system. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a computational system. 'Computer storage' or 'storage' is a further example of a computer-readable storage medium. Computer storage is any non-volatile computer-readable storage medium. In some examples, computer storage may also be computer memory or vice versa.

A 'computational system' as used herein encompasses an electronic component which is able to execute a program or machine executable instruction or computer executable code. References to the computational system comprising the example of "a computational system" should be interpreted as possibly containing more than one computational system or processing core. The computational system may for instance be a multi-core processor. A computational system may also refer to a collection of computational systems within a single computer system or distributed amongst multiple computer systems. The term computational system should also be interpreted to possibly refer to a collection or network of computing devices each comprising a processor or computational systems. The machine executable code or instructions may be executed by multiple computational systems or processors that may be within the same computing device or which may even be distributed across multiple computing devices.

Machine executable instructions or computer executable code may comprise instructions or a program which causes a processor or other computational system to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly. In other instances, the machine executable instructions or computer executable code may be in the form of programming for programmable logic gate arrays.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a computational system of a general-purpose computer, special purpose computer, or other programmable data processing apparatus to produce a machine, such that the instructions, which execute via the computational system of the computer or other programmable data processing apparatus, create means for implementing the functions/acts specified in the flowchart and/or block diagram block or blocks.

These machine executable instructions or computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The machine executable instructions or computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the computational system of a computer system to interact with and/or control an external computing device and/or apparatus. A hardware interface may allow a computational system to send control signals or instructions to an external computing device and/or apparatus. A hardware interface may also enable a computational system to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays. Electroluminescent display (ELD), Plasma display panels (PDP), Liquid crystal display (LCD), Organic light-emitting diode displays (OLED), a projector, and Head-mounted display.

The term 'machine learning' (ML) refers to a computer algorithm used to extract useful information from training data by building probabilistic frameworks, referred to as machine learning modules, in an automated way. The machine learning may be performed using one or more learning algorithms such as linear regression, K-means, classification algorithm, reinforcement algorithm etc. A 'machine learning module' may for example be an equation or set of rules that makes it possible to predict an unmeasured value from other, known values.

'Neural networks' as used herein encompasses are computing systems configured to learn, i.e., progressively improve their ability, to do tasks by considering examples, generally without task-specific programming. A neural network comprises a plurality of units referred to as neurons which are communicatively connected by connections for transmitting signals between connected neurons. The connections between neurons are referred to as synapses. Neurons receive a signal as input, change their internal state, i.e., the activation, according to the input. Depending on the input, the learned weights and bias an activation is generated as output and sent via one or more synapses to one or more connected neurons. The network forms a directed and weighted graph, where the neurons are the nodes and the connection between the neurons are weighted directed edges. The weights and biases may be modified by a process called learning, which is governed by a learning rule. The learning rule is an algorithm which modifies the parameters of the neural network, in order for a given input to the network to produce a favored output. This learning process may amount to modifying the weights and biases of the network.

The neurons may be organized in layers. Different layers may perform different types of transformations on their inputs. Signals applied to a neuronal network travel from a first layer, i.e., the input layer, to the last layer, i.e., output layer, traversing intermediate (hidden) layers arranged between input and output layer.

'Network parameters' as used herein encompass weights and biases of the neurons which may be varied as learning proceeds and which may increase or decrease the strength of signals that are sends downstream by the neurons via the synapses.

A 'medical system' as used herein encompasses any system comprising a memory storing machine executable instructions and a computational system configured for executing the machine executable instructions, where execution of the machine executable instructions causes the computational system to process medical images. The medical system may be configured for using a trained machine learning module for processing the medical images and/or to train a machine learning module for processing the medical images. The medical system may further be configured for generating the medical images using medical imaging data and/or for acquiring the medical imaging data for generating the medical images.

Medical imaging data is defined herein as being recorded measurements made by a tomographic medical imaging system descriptive of a subject. The medical imaging data may be reconstructed into a medical image. A medical image is defined herein as being the reconstructed two- or three-dimensional visualization of anatomic data contained within the medical imaging data. This visualization can be performed using a computer.

A Magnetic Resonance Imaging (MRI) image or MR image is defined herein as being the reconstructed two- or three-dimensional visualization of anatomic data contained within the magnetic resonance imaging data. This visualization can be performed using a computer.

A Computed Tomography (CT) image is defined herein as being the reconstructed two- or three-dimensional tomographic image reconstructed by a computer using data of X-ray measurements taken from different angles.

A Positron Emission Tomography (PET) image is defined herein as being a reconstructed two- or three-dimensional visualization of a distribution of a radiopharmaceutical injected into a body as a radiotracer. Gamma ray emission caused by the radiotracer may be detected, e.g., using a gamma camera. This imaging data may be used to reconstructed a two- or three-dimensional image. A PET scanner may, e.g., be incorporate in a CT scanner. PET images may, e.g., be reconstructed using a CT scan performed using one scanner during the same session.

A Single-Photon Emission Computed Tomography (SPECT) is defined herein as being a reconstructed two- or three-dimensional visualization of a distribution of a gamma-emitting radiopharmaceutical injected into the body as a radiotracer. The SPECT imaging is performed by using a gamma camera to acquire imaging data from multiple angles. A computer is used to reconstruct two- or three-dimensional tomographic images using the acquired imaging data. SPECT is similar to PET in its use of radiotracer and detection of gamma rays. In contrast with PET, the radiotracers used in SPECT emit gamma radiation that is measured directly, whereas PET radiotracers emit positrons that annihilate with electrons providing gamma rays.

BRIEF DESCRIPTION OF THE DRAWINGS

In the following preferred embodiments of the invention will be described, by way of example only, and with reference to the drawings in which.

DESCRIPTION OF EMBODIMENTS

Like numbered elements in these figures are either equivalent elements or perform the same function. Elements which have been discussed previously will not necessarily be discussed in later figures if the function is equivalent.

Figure 1:
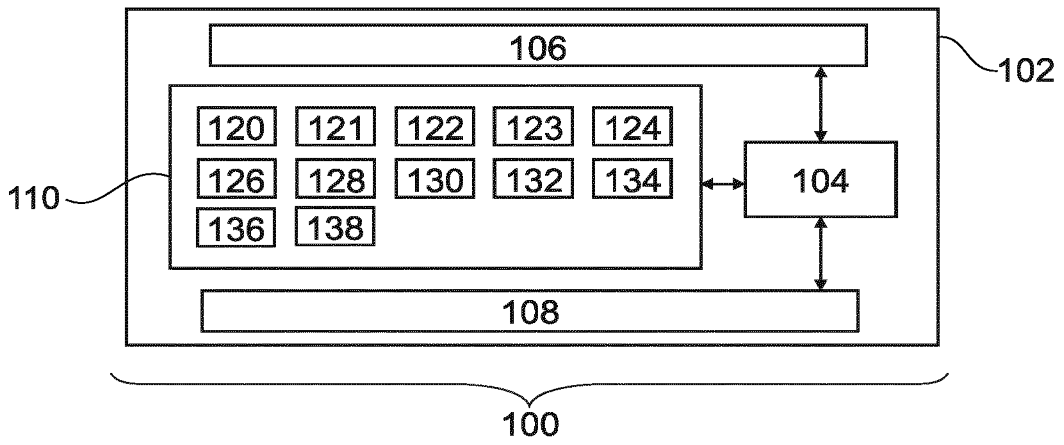
FIG. 1 illustrates an example of a medical system.

FIG. 1 illustrates an example of a medical system 100. The medical system is shown as comprising a computer 102. The computer 102 is intended to represent one or more computational or computing devices. The computer 102 could for example be a computer receiving medical images 124 for predicting saliency maps 126 and/or receiving acquired medical imaging data 123 for reconstructing medical images 124. The computer 102 could for example be integrated into a medical imaging system configured for acquiring medical imaging data as part of its control system. A medical imaging system may, e.g., be a magnetic resonance imaging system, a computed-tomography imaging system or an advanced molecular imaging system, e.g., a positron emission tomography imaging system or a single photon emission computed tomography imaging system. In other examples, the computer 102 could be a remote computer system used to reconstruct images remotely. For example, the computer 102 could be a server in a radiology department or it could be a virtual computer system located in a cloud computing system.

The computer 102 is further shown as comprising a computation system 104. The computational system 104 is intended to represent one or more processors or processing cores or other computational systems that are located at one or more locations. The computational system 104 is shown as being connected to an optional hardware interface 106. The optional hardware interface 106 may for example enable the computational system 104 to control other components such as a magnetic resonance imaging system, a computed-tomography imaging system, a positron emission tomography imaging system, or a single photon emission computed tomography imaging system.

The computational system 104 is further shown as being connected to an optional user interface 108 which may for example enable an operator to control and operate the medical system 100. The optional user interface 108 may, e.g., comprise an output and/or input device enabling a user to interact with the medical system. The output device may, e.g., comprise a display device configured for displaying medical images. The input device may, e.g., comprise a keyboard and/or a mouse enabling the user to insert control commands for controlling the medical system 100. The optional user interface 108 may, e.g., comprise an eye tracking device, like a camera, configured for tracking positions and/or movements of eyes of a user using the medical system 100. The computational system 104 is further shown as being connected to a memory 110. The memory 110 is intended to represent different types of memory which could be connected to the computational system 104.

The memory is shown as containing machine-executable instructions 120. The machine-executable instructions 120 enable the computational system 104 to perform tasks such as controlling other components as well as performing various data and image processing tasks. The machine-executable instructions 120 may, e.g., enable the computational system 104 to control other components such as a magnetic resonance imaging system, a computed-tomography imaging system, a positron emission tomography imaging system, or a single photon emission computed tomography imaging system.

The memory 110 is further shown as containing a trained machine learning module 122 configured for receiving a medical image 124 and, in response, providing a saliency map 126. The saliency map 126 predicts a distribution of user attention over the medical image 124. The medical image 124 may, e.g., be an MRI image, a CT image or an AMI image, like a PET image or a SPECT image.

The memory 110 is further shown as containing medical imaging data 123. The medical system 100 may, e.g., be configured to reconstruct the medical image 124 using the medical imaging data 123. The medical imaging data 123 may, e.g., be MRI data, CT imaging data or AMI data, like PET imaging data or SPECT imaging data. For example, the memory 110 may contain a further machine learning module 121 configured for receiving the medical imaging data 123 and, in response, providing the reconstructed medical image 124.

The memory 110 is further shown as containing a set of test maps 128. The medical system 100 may be configured to execute different reconstruction method for reconstructing medical images, like the medical image 124, e.g., using the medical imaging data 123. Each of the test maps 128 may be assigned to a different one of the reconstruction methods and identify sections of a test image for which a quality of image reconstruction is the highest using the assigned reconstruction method. The test image, e.g., the medical image 124, may display a pre-defined type of anatomical structure for which a medical image is to be reconstructed using one of the reconstruction methods. In case a medical image of a brain is to be reconstructed, the test image may show a brain structure. The sections identified by the test maps may comprising anatomical sub-structures of the pre-defined type of anatomical structure for which a quality of image reconstruction is the highest compared to other anatomical sub-structures of the pre-defined type of anatomical structure, when using the assigned reconstruction method. For example, in case one of the reconstruction methods provides high image quality for white matter in the brain, a test map assigned to this reconstruction method may indicate, e.g., highlight white matter comprised by the test image. For example, in case one of the reconstruction methods provides high image quality for grey matter in the brain, a test map assigned to this reconstruction method may indicate, e.g., highlight grey matter comprised by the test image. For example, in case one of the reconstruction methods provides high image quality for cerebrospinal fluid in the brain, a test map assigned to this reconstruction method indicate, e.g., highlight cerebrospinal fluid comprised by the test image. For example, medical image 124 may be the test image and saliency map 126 may be used to select one of the reconstruction methods for reconstructing for reconstruction one or more medical images. The saliency map 126 may be used to determine one of the test maps 128 having a highest level of structural similarity with the saliency map 126. The reconstruction method assigned to the determined test map may be selected and one or more medical images may be reconstructed using the selected reconstruction method. For example, the medical imaging data 123 may be used for reconstructing the medical images.

The memory 110 is further shown as containing an OOD estimation module 130 configured for receiving a medical image 124 and, in response, providing an OOD map 132 representing levels of compliance of the input medical image 124 with a reference distribution defined by a set of reference medical images. The memory 110 may further contain a weighted OOD map 134 generated weighting the levels of compliance represented by the OOD map 132 using the distribution of user attention over the medical image 124 predicted by the saliency map 126. The weighted levels of compliance provided by the weighted OOD map 134 may, e.g., be used for calculating an OOD score describing a probability that the medical image 124 as a whole is within the reference distribution.

The memory 110 is further shown as containing an image quality assessment module 136 configured for receiving a medical image 124 and, in response, providing an image quality map 138 representing a distribution of levels of image quality over the input medical image 124. The levels of image quality may be weighted using the distribution of user attention over the input medical image 124 predicted by the input saliency map 126, when receiving the saliency map 126 together with the medical image 124 as input. The weighted levels of image quality provided by the image quality map 138 may, e.g., be used for calculating an image quality score providing, e.g., an averaged image quality of the medical image 124.

The image quality assessment module 136 may, e.g., be used by the medical system 100 for training the machine learning module 121. The image quality estimated by the image quality assessment module 136 may, e.g., be descriptive of losses of the medical image 124 output by the machine learning module 121 relative to one or more reference medical images. For example, training data for training the machine learning module 121 may be provided. The respective training data may, e.g., be contained by the memory 110. The training data for training the machine learning module 121 may comprise pairs of training medical imaging data and training medical images reconstructed using the training medical images data. The machine learning module 121 may be trained to output the training medical images in response to receiving the training medical images data. The training may comprise for each of the pairs providing the respective training medical imaging data as input to the machine learning module 121 and receiving a preliminary medical image as output. The received preliminary medical image may, e.g., be the medical image 124. The distribution of image quality represented by the image quality map 138 received for the medical image 124 from the image quality assessment module 136 may be used as a distribution of losses over the medical image 124 relative to the training medical image of the respective pair. The training medical image may be provided as a reference medical image to the image quality assessment module 136 for determining the received image quality map 138. Training of the machine learning module 121 may comprise adjusting parameters of the machine learning module until the losses over the medical image 124 satisfy a predefined criterion. The criterion may, e.g., require that the losses are smaller than a predefined threshold.

Figure 2:
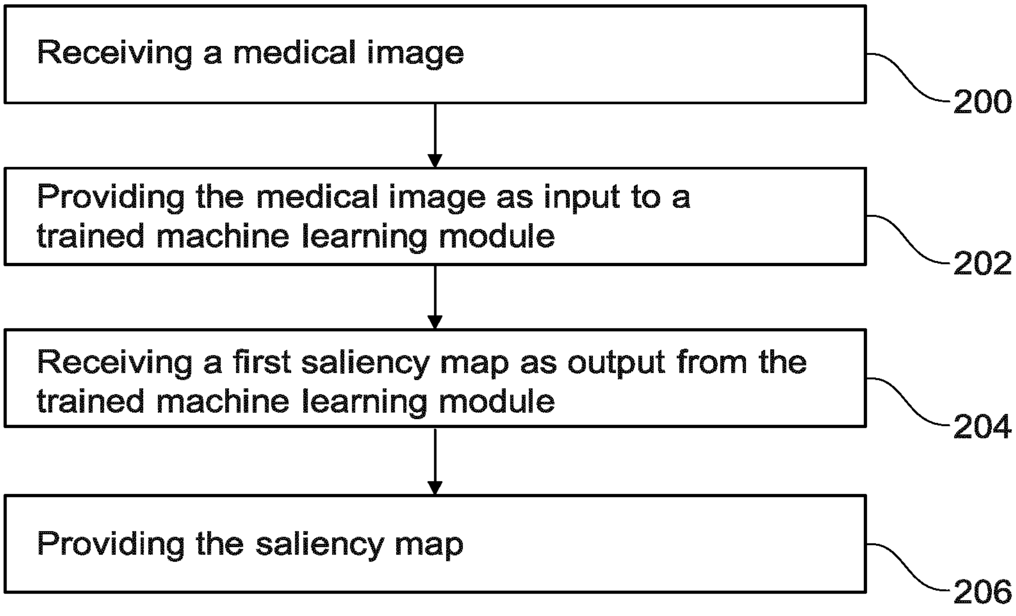
FIG. 2 shows a flow chart which illustrates an exemplary method of predicting a saliency map.

FIG. 2 shows a flowchart which illustrates an exemplary method of predicting a saliency map using a trained machine learning module. The method of FIG. 2 may, e.g., be executed by the medical system 100 of FIG. 1. In block 200, a medical image is received. The medical image may be reconstructed using acquired medical imaging data or the medical image may be provided in reconstructed form. In block 202, the medical image is provided as input to the trained machine learning module. In block 204, a saliency map of the medical image is received as output from the trained machine learning module in response to providing of the medical image as input. The received saliency map predicts a distribution of user attention over the provided medical image. In block 204, the saliency map of the medical image is provided for further usage. For example, the saliency map may be used for selecting a suitable method of image reconstruction, for weighting a OOD map and/or for weighting an image quality map. Such a weighting of an image quality map may, e.g., be used for training a further machine learning module to reconstruct medical images from medical imaging data.

Figure 3:
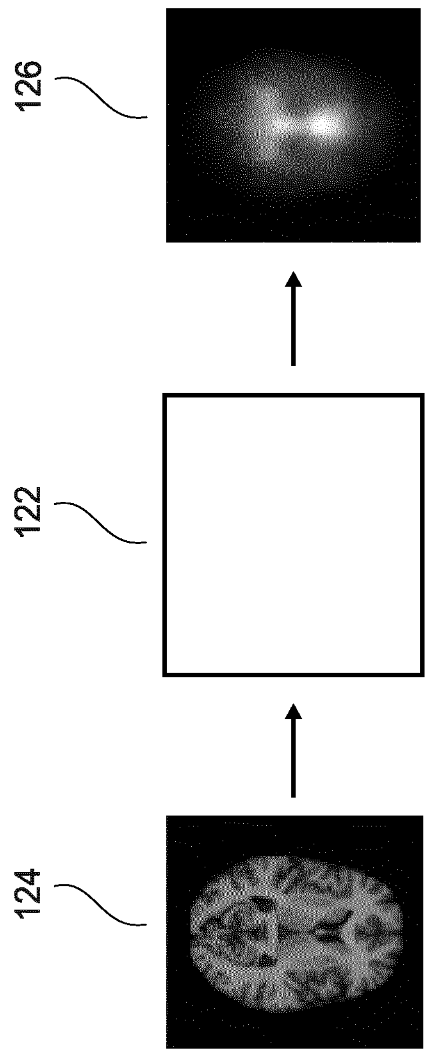
FIG. 3 shows a flow chart which illustrates an exemplary method of predicting a saliency map.

FIG. 3 shows a further flowchart which illustrates an exemplary method of predicting a saliency map. As shown in FIG. 3, a medical image 124, e.g., of a brain, is provided to the trained machine learning module 122. The trained machine learning module 122 is configured, i.e., trained, to provide a saliency map 126 in response to receiving the medical image 124. The saliency map 126 predicts a distribution of user attention over the medical image 124. The brighter a pixel in saliency map 126 of FIG. 3 is, the higher a predicted level of user attention for that pixel in the medical image 124 may be.

Figure 4:
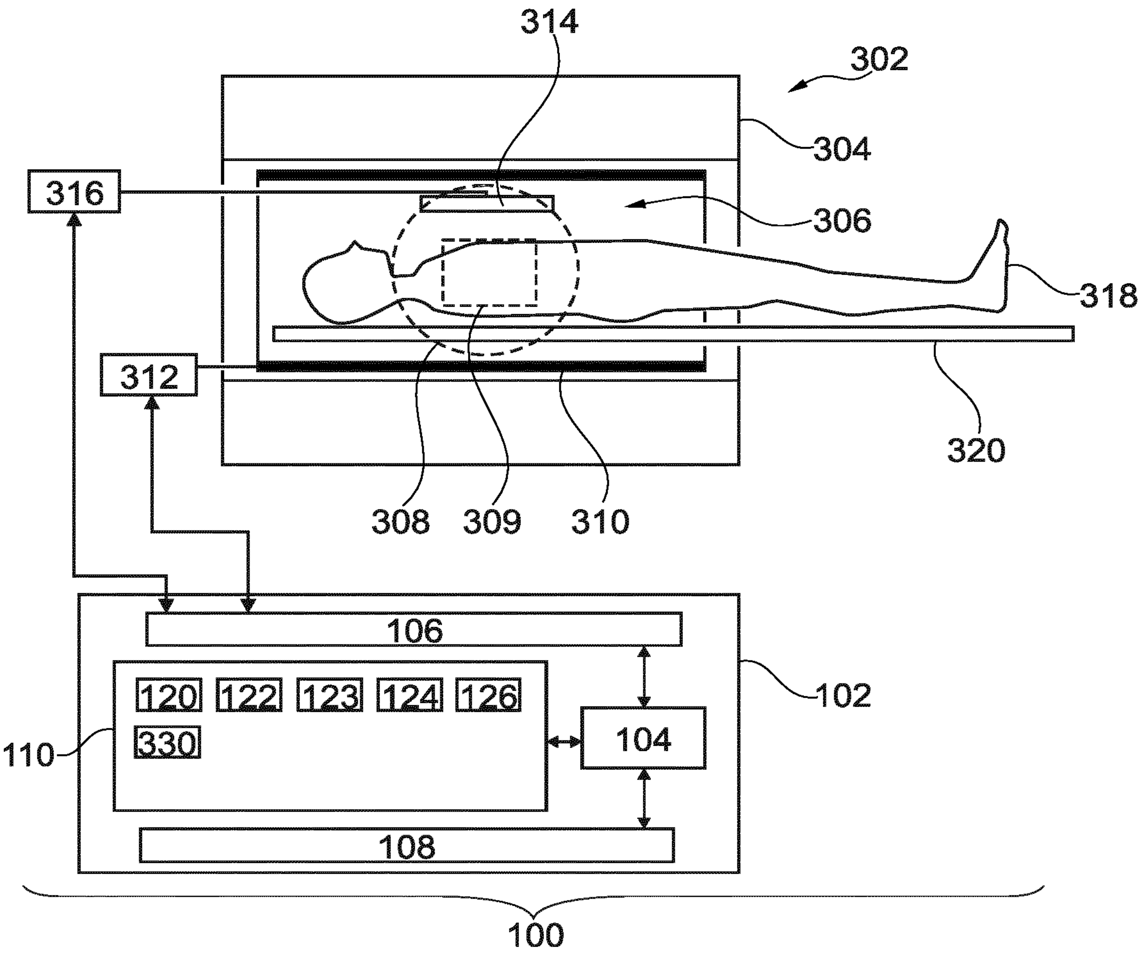
FIG. 4 illustrates a further example of a medical system.

FIG. 4 illustrates a further example of a medical system 100 comprising a magnetic resonance imaging system 302. The medical system 100 depicted in FIG. 4 is similar to the medical system 100 depicted in FIG. 1 except that it additionally comprises a magnetic resonance imaging system 302 that is controlled by the computational system 104.

The magnetic resonance imaging system 302 comprises a magnet 304. The magnet 304 is a superconducting cylindrical type magnet with a bore 306 through it. The use of different types of magnets is also possible; for instance, it is also possible to use both a split cylindrical magnet and a so-called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils.

Within the bore 306 of the cylindrical magnet 304 there is an imaging zone 308 where the magnetic field is strong and uniform enough to perform magnetic resonance imaging. A region of interest 309 is shown within the imaging zone 308. The magnetic resonance data that is acquired typically acquired for the region of interest. A subject 318 is shown as being supported by a subject support 320 such that at least a portion of the subject 318 is within the imaging zone 308 and the region of interest 309.

Within the bore 306 of the magnet there is also a set of magnetic field gradient coils 310 which is used for acquisition of preliminary magnetic resonance data to spatially encode magnetic spins within the imaging zone 308 of the magnet 304. The magnetic field gradient coils 310 connected to a magnetic field gradient coil power supply 312. The magnetic field gradient coils 310 are intended to be representative. Typically, magnetic field gradient coils 310 contain three separate sets of coils for spatially encoding in three orthogonal spatial directions. A magnetic field gradient power supply supplies current to the magnetic field gradient coils. The current supplied to the magnetic field gradient coils 310 is controlled as a function of time and may be ramped or pulsed.

Adjacent to the imaging zone 308 is a radio-frequency coil 314 for manipulating the orientations of magnetic spins within the imaging zone 308 and for receiving radio transmissions from spins also within the imaging zone 308. The radio frequency antenna may contain multiple coil elements. The radio frequency antenna may also be referred to as a channel or antenna. The radio-frequency coil 314 is connected to a radio frequency transceiver 316. The radio-frequency coil 314 and radio frequency transceiver 316 may be replaced by separate transmit and receive coils and a separate transmitter and receiver. It is understood that the radio-frequency coil 314 and the radio frequency transceiver 316 are representative. The radio-frequency coil 314 is intended to also represent a dedicated transmit antenna and a dedicated receive antenna. Likewise, the transceiver 316 may also represent a separate transmitter and receivers. The radio-frequency coil 314 may also have multiple receive/transmit elements and the radio frequency transceiver 316 may have multiple receive/transmit channels. For example, if a parallel imaging technique such as SENSE is performed, the radio-frequency could 314 will have multiple coil elements.

The transceiver 316 and the gradient controller 312 are shown as being connected to the hardware interface 106 of the computer system 102.

The memory 110 is further shown as containing pulse sequence commands 330. The pulse sequence commands 330 are commands or data which may be converted into such commands that are configured for controlling the magnetic resonance imaging system 302 to acquire the medical image data 123 from the region of interest 309. In case of the medical system 100 according to FIG. 4, the medical image data 123 is magnetic resonance imaging data and the medical image 124 reconstructed using the medical image data 123 is an MRI image.

Figure 5:
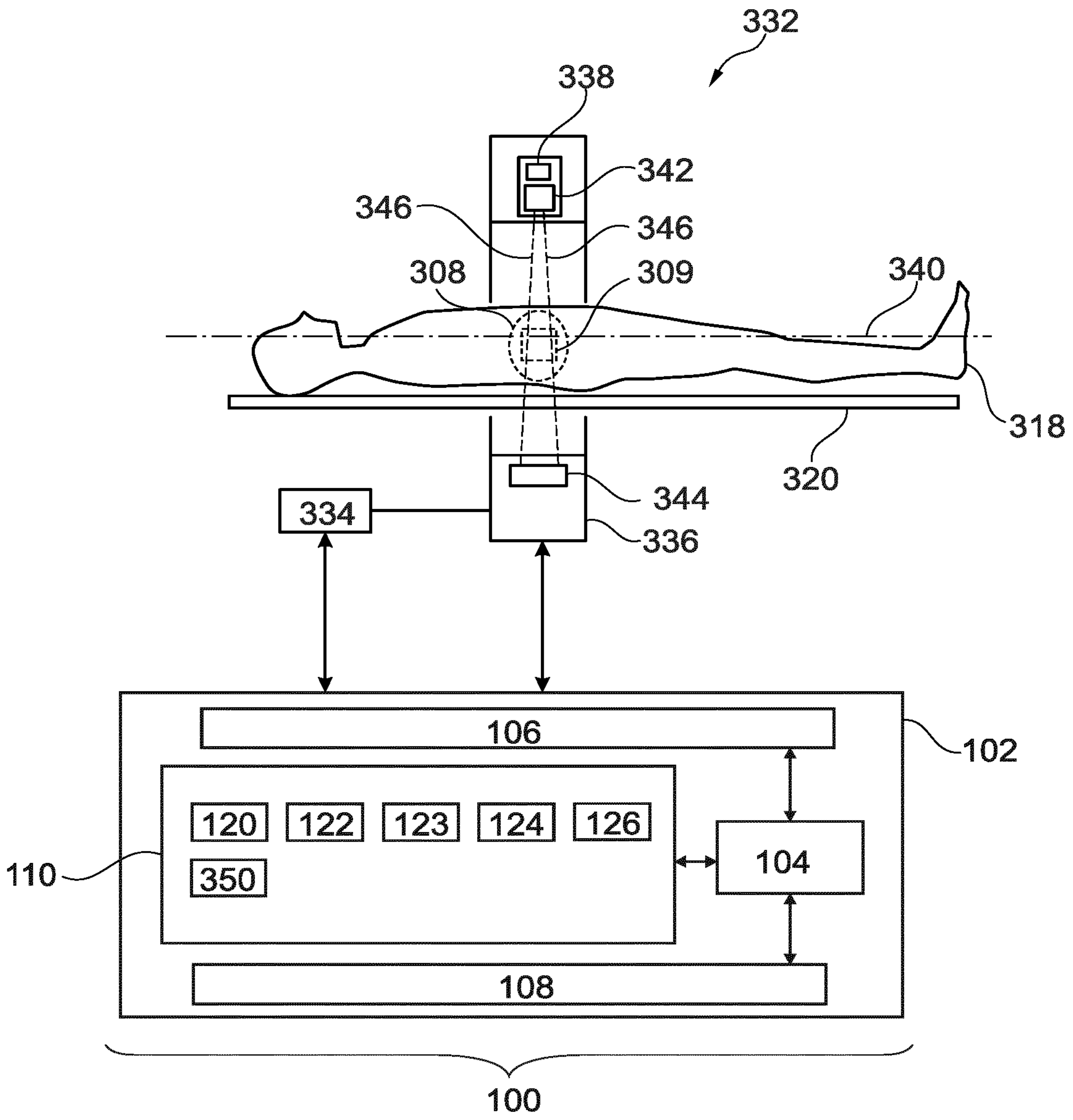
FIG. 5 illustrates a further example of a medical system.

FIG. 5 illustrates a further example of a medical system 100. The medical system 100 depicted in FIG. 4 is similar to the medical system 100 depicted in FIG. 1 except that it additionally comprises a computed tomography imaging system 332 that is controlled by the computational system 104. The CT system 332 is shown as being controlled by the computer 102. The hardware interface 106 allows the computational system 104, e.g., processor, to exchange data with and control the CT system 332. The memory 110 of the computer system 102 is shown as containing additional CT system control commands 350 for controlling the CT system 332. The CT system control commands 350 may be used by the computational system 104 to control the CT system 332 to acquire medical imaging data 123 in form of CT imaging data. The CT imaging data 123 may be used to reconstruct a medical image 124 in form of a CT image.

The CT system 332 may comprise a rotating gantry 336. The gantry 336 may rotates about an axis of rotation 340. There is a subject 318 shown on a subject support 320. Within the gantry 336 is an X-ray tube 342, e.g., within an X-ray tube high voltage isolation tank. In addition, a voltage stabilizer circuit 338 may be provided with the X-ray tube 342, within an X-ray power supply 334 or external to both. The X-ray power supply 334 supplies the X-ray tube 342 with power.

The X-ray tube 334 produces X-rays 346 that pass through the subject 318 and are received by a detector 344. Within the area of the box 309 is a region of interest within an imaging zone 308, where CT or computer tomography images 124 of the subject 318 can be made.

For positron emission tomography imaging (PET) or single photon emission computed tomography imaging (SPECT), a similar system may be used with a detector 344 comprising a gamma camera. In case of positron emission tomography or single photon emission computed tomography, no external radiation sources are required. For example, detector 344 of the CT system 332 may comprise a gamma camera and be used for PET-CT imaging or SPECT-CT imaging, i.e., a combination of PET and CT or a combination of SPECT and CT, respectively.

Figure 6:
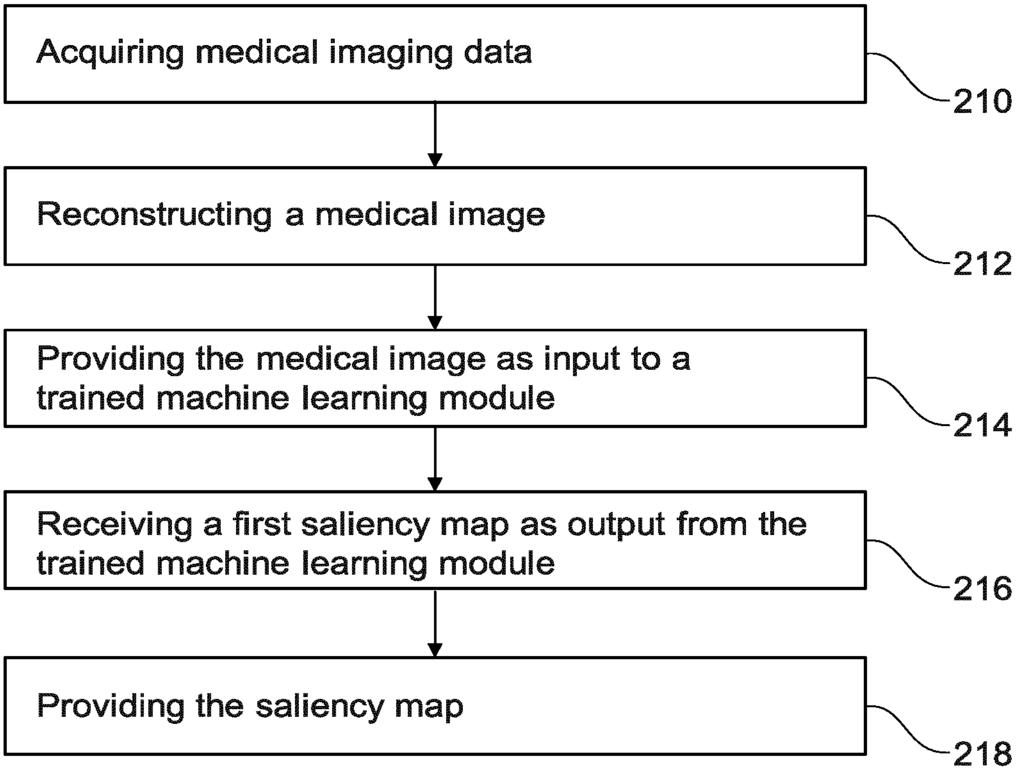
FIG. 6 shows a flow chart which illustrates an exemplary method of predicting a saliency map.

FIG. 6 shows a flow chart which illustrates an exemplary method of predicting a saliency map, e.g., using the medical system of FIG. 4 or FIG. 5. Alternatively or additionally, the medical system may be configured for PET imaging or SPECT imaging. In block 210, medical imaging data is acquired using a medical imaging system comprised by the medical system. In case of the medical system of FIG. 4, the medical imaging system is an MRI system and the medical imaging data is MRI data. In case of the medical system of FIG. 5, the medical imaging system is a CT imaging system and the medical imaging data is CT data. In block 212 a medical image is reconstructed using medical imaging data acquired in block 210. In case of the medical system of FIG. 4, the medical image is an MRI image. In case of the medical system of FIG. 5, the medical image is a CT image. The further blocks 214, 216, and 218 of FIG. 6 are equivalent to blocks 202, 204, and 206 of FIG. 2. For PET and SPECT an analogous method may be used for predicting saliency maps.

Figure 7:
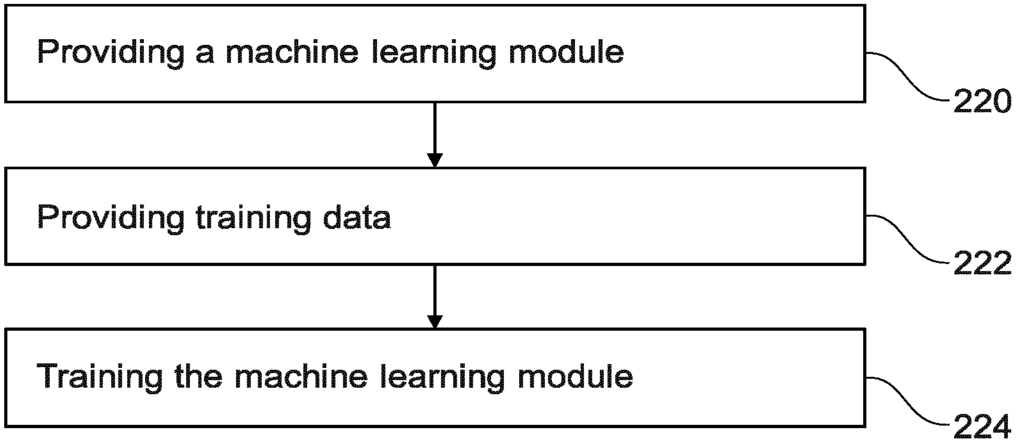
FIG. 7 shows a flow chart which illustrates an exemplary method of training a machine learning module to predict saliency maps.

FIG. 7 shows a flow chart which illustrates an exemplary method of training a machine learning module to predict saliency maps. In block 220, the machine learning module to be trained is provided. The provided machine learning module may, e.g., be an untrained machine learning module or a pre-trained machine learning module, which is trained further. In block 222, training data for training the machine learning module is provided. The training data comprises pairs of training medical images and training saliency maps. The training salient maps are descriptive of distributions of user attention over the training medical images. In block 224, the machine learning module is trained using the provided training data. The resulting trained machine learning module is trained to output the training saliency maps of the pairs in response to receiving the training medical images of the pairs.

Figure 8:
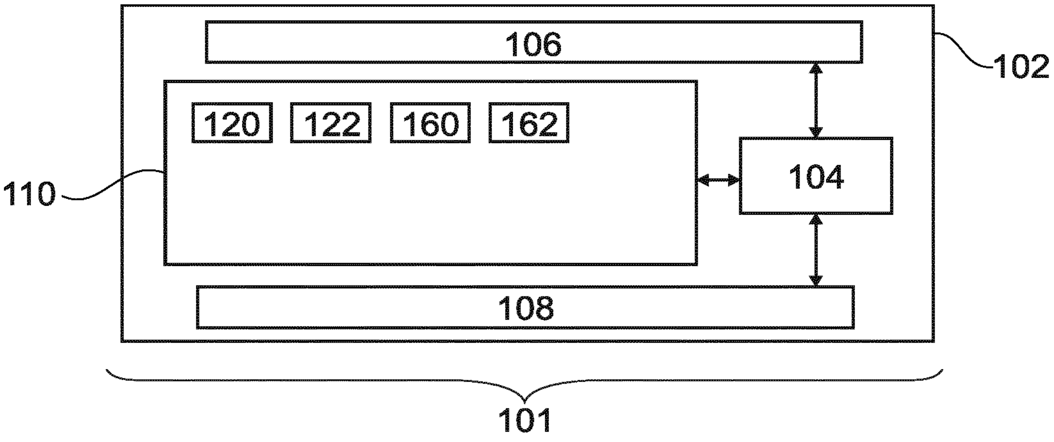
FIG. 8 illustrates an example of a medical system configured for training a machine learning module.

FIG. 8 illustrates an example of a medical system 101 configured for training a machine learning module 160 to output in response to receiving a medical image as input a saliency map as output. The resulting saliency map is predictive of a distribution of user attention over the medical image provided as input. The machine learning module 160 may, e.g., be an untrained machine learning module or a partially pre-trained machine learning module. Training the machine learning module 160 results in the trained machine learning module 122. The medical system 101 is shown as comprising a computer 102. The computer 102 is intended to represent one or more computational or computing devices. For example, the computer 102 could be a remote computer system used to train the machine learning module 160 remotely. For example, the computer 102 could be a server in a radiology department or it could be a virtual computer system located in a cloud computing system.

The computer 102 is further shown as comprising a computation system 104. The computational system 104 is intended to represent one or more processors or processing cores or other computational systems that are located at one or more locations. The computational system 104 is shown as being connected to an optional hardware interface 106. The optional hardware interface 106 may for example enable the computational system 104 to control other components.

The computational system 104 is further shown as being connected to an optional user interface 108 which may for example enable an operator to control and operate the medical system 101. The optional user interface 108 may, e.g., comprise an output and/or input device enabling a user to interact with the medical system. The output device may, e.g., comprise a display device configured for displaying medical images and saliency maps. The input device may, e.g., comprise a keyboard and/or a mouse enabling the user to insert control commands for controlling the medical system 101. The optional user interface 108 may, e.g., comprise an eye tracking device, like a camera, configured for tracking positions and/or movements of eyes of a user using the medical system 101. The computational system 104 is further shown as being connected to a memory 110. The memory 110 is intended to represent different types of memory which could be connected to the computational system 104.

The memory is shown as containing machine-executable instructions 120. The machine-executable instructions 120 enable the computational system 104 to perform tasks such as controlling other components as well as performing various data and image processing tasks. The machine-executable instructions 120 may, e.g., enable the computational system 104 to train the machine learning module 160 and provide the trained machine learning module 122 as a result of the training.

For the training of the machine learning module 160 training data 162 may be provided. The training data may comprise pairs of training medical images and training saliency maps. The training salient maps are descriptive of distributions of user attention over the training medical images. The training saliency maps may, e.g., be generated using an eye tracking device, like a camera, configured for tracking positions and/or movements of eyes of a user using the medical system 101. Based on the tracking data provided by the eye tracking device distributions of user attention over the training medical images may be determined resulting in the saliency maps. The machine learning module 160 is trained using the provided training data 162. The machine learning module 160 is trained to output the training saliency maps of the pairs in response to receiving the training medical images of the pairs. Thus, the machine learning module 122 may be generated.

Figure 9:
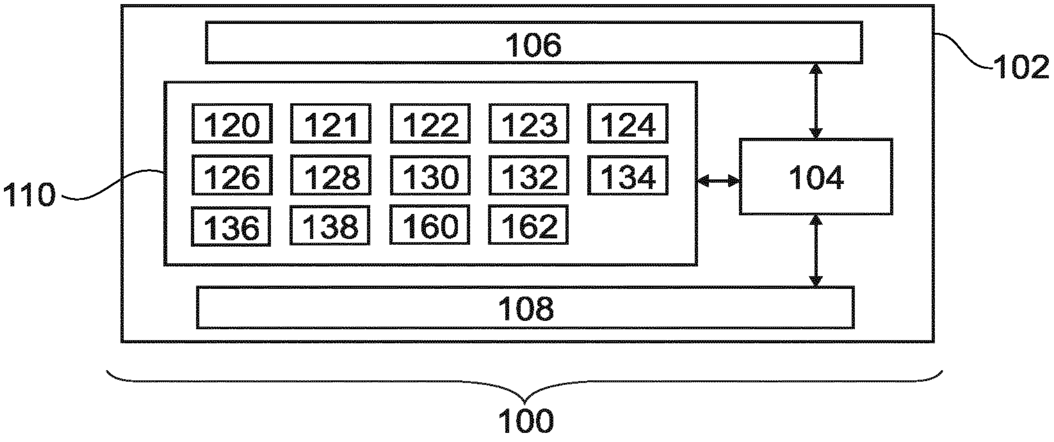
FIG. 9 illustrates an example of a medical system configured for training a machine learning module.

FIG. 9 illustrates another example of a medical system 100 configured for training a machine learning module 160 to output in response to receiving a medical image as input a saliency map as output. The resulting saliency map is predictive of a distribution of user attention over the medical image provided as input. The machine learning module 160 may, e.g., be an untrained machine learning module or a partially pre-trained machine learning module. Training the machine learning module 160 results in the trained machine learning module 122.

The medical system 100 shown in FIG. 9 corresponds to the medical system 100 shown in FIG. 1. The medical system 100 shown in FIG. 9 in addition comprises the machine learning module 160 to be trained using the training data 162, in order to provide the trained machine learning module 122. The machine-executable instructions 120 may, e.g., enable the computational system 104 to train the machine learning module 160 and provide the trained machine learning module 122 as a result of the training.

For the training of the machine learning module 160 training data 162 may be provided. The training data may comprise pairs of training medical images and training saliency maps. The training salient maps are descriptive of distributions of user attention over the training medical images. The training saliency maps may, e.g., be generated using an eye tracking device, like a camera, configured for tracking positions and/or movements of eyes of a user using the medical system 100. Based on the tracking data provided by the eye tracking device distributions of user attention over the training medical images may be determined resulting in the saliency maps. The machine learning module 160 is trained using the provided training data 162. The machine learning module 160 is trained to output the training saliency maps of the pairs in response to receiving the training medical images of the pairs. Thus, the machine learning module 122 may be generated.

Figure 10:
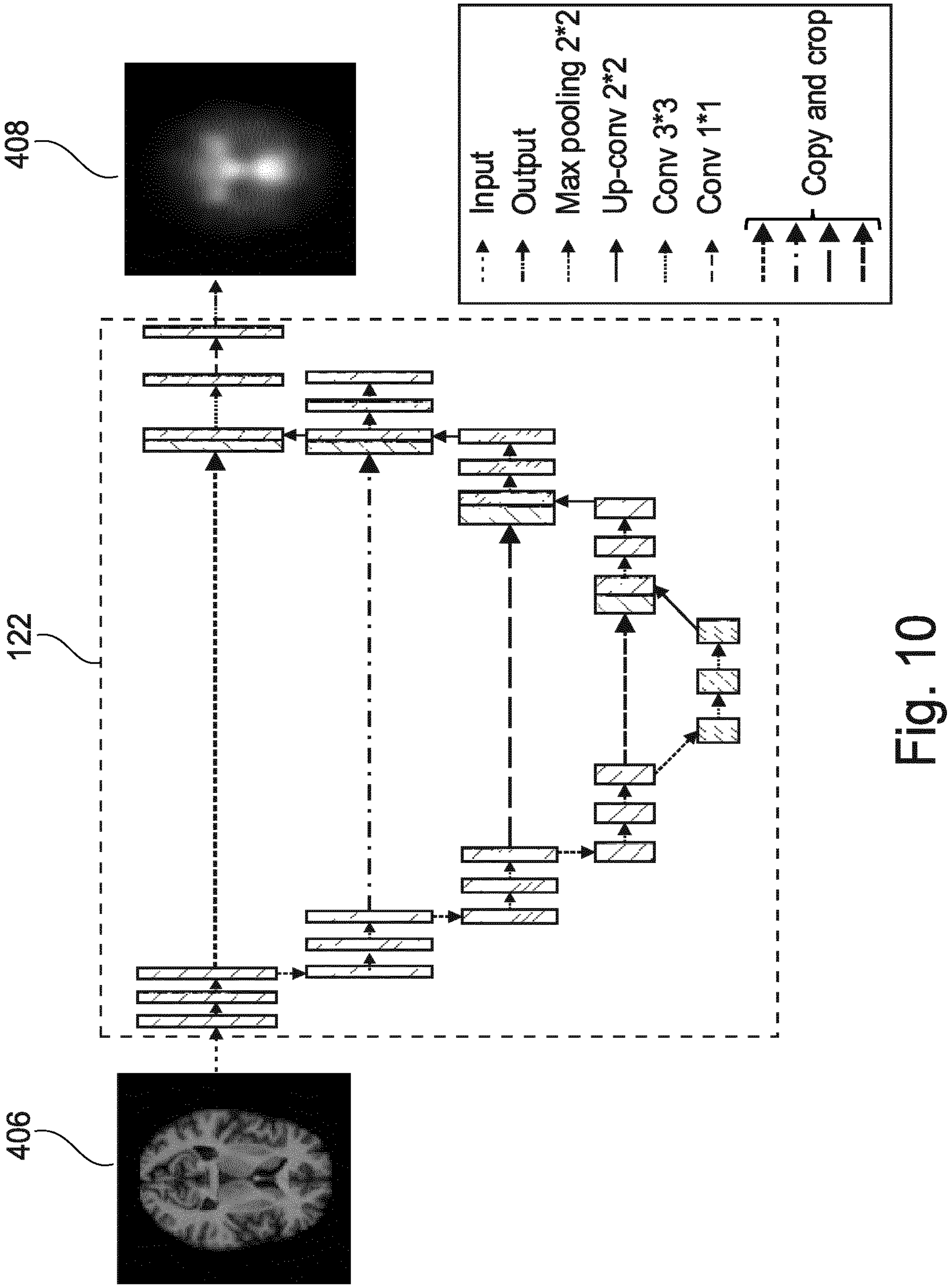
FIG. 10 shows an exemplary machine learning module with a neural network being trained to predict saliency maps.

FIG. 10 shows an exemplary trained machine learning module 122 with a neural network being trained to predict saliency maps. The exemplary architecture of the neural network of provided may be a U-Net architecture. A U-Net is a convolutional neural network. Convolutional neural networks are a class of deep neural network, which are, e.g., applied to analyze visual imagery. The U-Net comprises a contracting path and an expansive path, which gives it the u-shaped architecture. The contracting path is a typical convolutional network that consists of repeated application of convolutions, each may be followed by a rectified linear unit (ReLU) and a max pooling operation. During the contraction, spatial information may be reduced while feature information is increased. The expansive path may combine the feature and spatial information through a sequence of up-convolutions and concatenations with high-resolution features from the contracting path.

Such a machine learning module 122, e.g., with a U-Net architecture, may be trained to mimic a user's, e.g., a radiologist's, behavior related to a displayed medical image. For example, user attention as it is detected in FIG. 12 below may be mimicked. For this purpose, training data may be provided comprising pairs of training medical images, e.g., the medical images 406 displayed in FIG. 12. and training saliency maps, e.g., the saliency maps 408 determined in FIG. 12 below for the displayed medical images 406. The machine learning module 122 may be trained to receive such a training medical image 406 as input and generate in response the training saliency map 408 assigned to the input training medical images 406 as output. Thus, the machine learning module 122 may be enabled to predict saliency maps also for other medical images.

Figure 12:
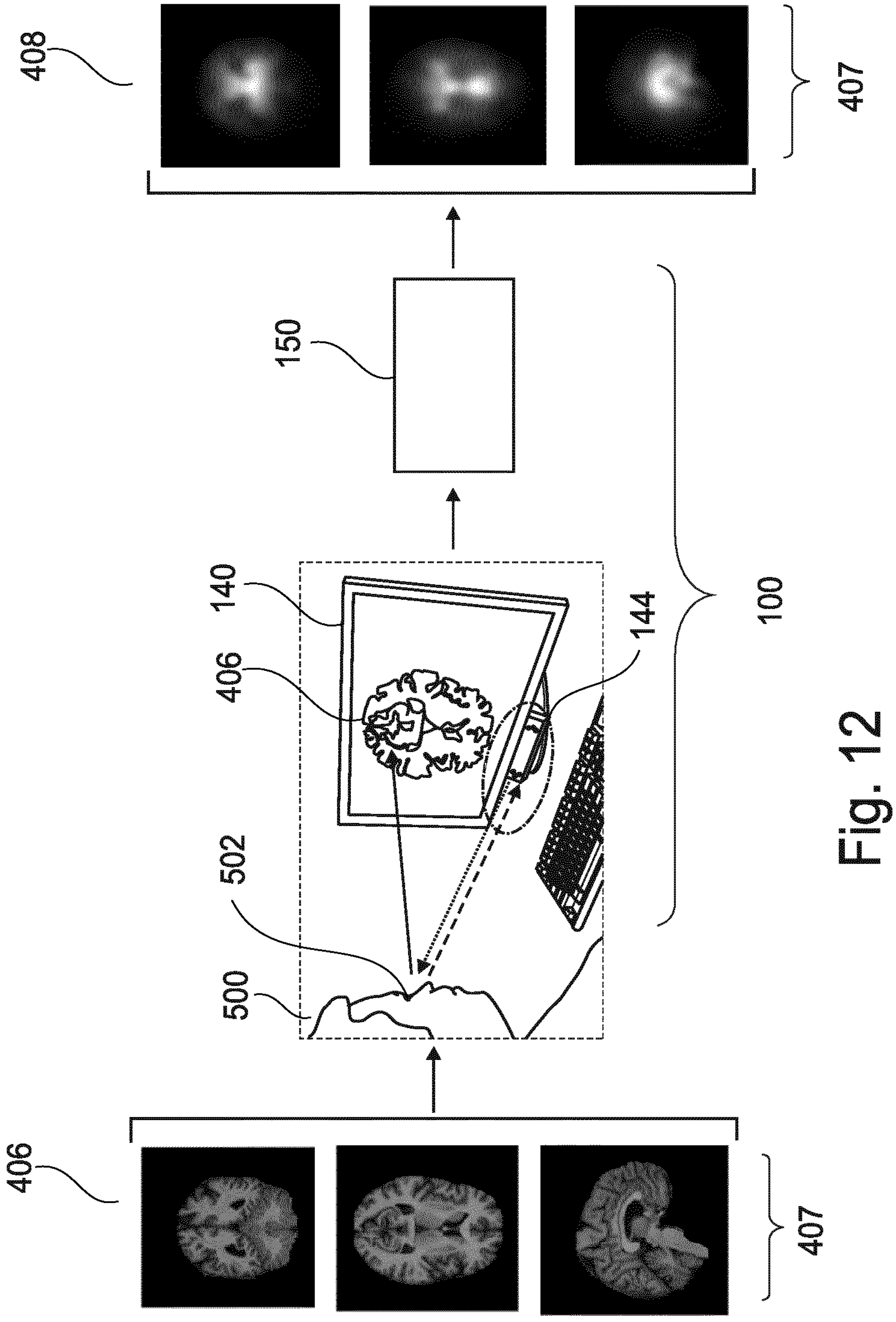
FIG. 12 shows a flow chart which illustrates an exemplary method of generating training saliency maps.

For example, the machine learning module 122 for predicting saliency maps may be trained on the training pairs of medical images 406 and their corresponding saliency maps 408, acquired as shown in FIG. 12 below, using a loss function designed for image-to-image translation tasks. For example, a loss function, such as MSE, MAE, SSIM, or a combination thereof may be used. The trained machine learning module 122 may be configured to take medical images as input and predicts saliency maps. For example, such a saliency may predict a distribution of user attention. Such a saliency map may, e.g., be used as a guidance for a user to indicate on which regions of a given medical image user attention should be focused. Alternatively or additionally, such a saliency map may be used in context of image reconstruction and/or medical image analysis.

Figure 11:
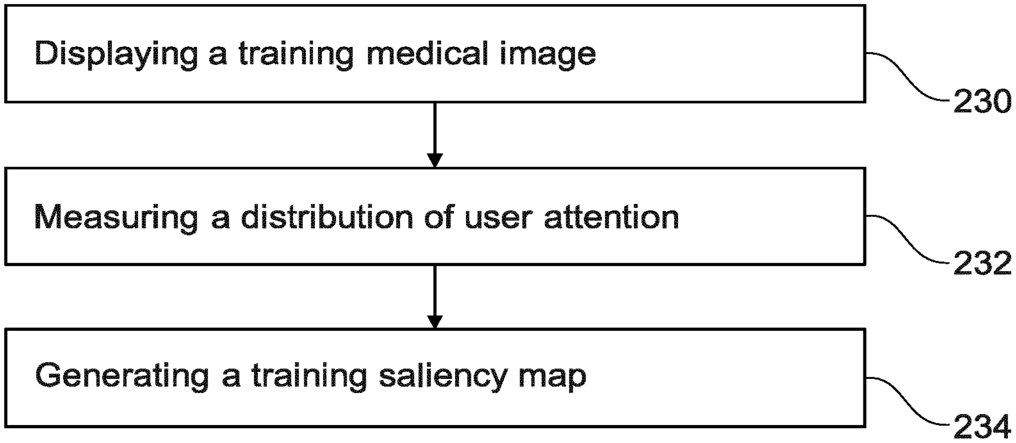
FIG. 11 shows a flow chart which illustrates an exemplary method of generating training saliency maps.

FIG. 11 illustrates an exemplary method for providing training saliency maps to a machine learning module. In block 230, a training medical image is displayed using a display device of a medical system used to providing training saliency maps. In block 232, a distribution of user attention over the displayed training medical image is measured. The user attention may, e.g., be measured based on user interaction with the training medical image. For example, positions and movements of a cursor controlled by the user within the displayed training medical image may be measured. For example, the user attention may be measured using an eye tracking device configured for measuring positions and movements of eyes of a user of the medical system. An attention determining module configured for determining the distribution of user attention over the displayed training medical image using the eye tracking device may be used to determine for the user of the medical system looking at the displayed training medical image points of attention within the displayed training medical image. In block 234, the training saliency map is generated using the measured distribution of user attention over the training medical image.

FIG. 12 illustrates an exemplary method for generating training data for training a machine learning module to generate saliency maps predicting distributions of user attention over medical images. Training saliency data may be acquired in form of user attention data determined using, e.g., an eye tracking device 144 for tracking regions of medical images 406 on which user attention is focused. The acquired training saliency data is used for generating saliency maps 408. The saliency maps 408 may be used in combination with the medical images 406 as training data 407 to train a machine learning module to provide a saliency map as output in response to receiving a given medical image as input. The trained machine learning model may be used to generate a saliency map at runtime predicting a distribution of user attention over a given medical image.

In FIG. 12, an exemplary pipeline for building training saliency maps 408 using eye tracking of a user 500, e.g., a radiologist, examining medical images, like MR images, is illustrated. Training data comprising a set of medical images 406, i.e., training medical images is presented to the radiologist 500, e.g., displayed on a display device 140 of a medical device 100. Positions and movements of the eyes 502 of the radiologists 500 are recorded using an eye-tracking device 144, like a camera. The collected eye-tracking data is transformed into saliency maps 408 representing distributions of user attention of the radiologist 500 over the displayed medical images 406. For this purpose, an attention determining module 150 may be provided. The attention determining module 150 may be configured for determining the distribution of user attention over the displayed training medical image 406 using the eye tracking device 144. It may, e.g., be used to determine for the user 500 of the medical system 100 looking at the displayed training medical image 406 points of attention within the displayed training medical image 406. In block 234, the training saliency map is generated using the measured distribution of user attention over the training medical image. The medical images 406 displayed may be combined pairwise with the saliency maps 408 generated to provide pairs of training data 407 for training a machine learning module to predict saliency maps for given medical images. Each pair of training data 407 comprises a training medical image 406 as well as a training saliency map 408 representing a distribution of user attention over the respective training medical image 406 determined using the eye-tracking device 144.

Figure 13:
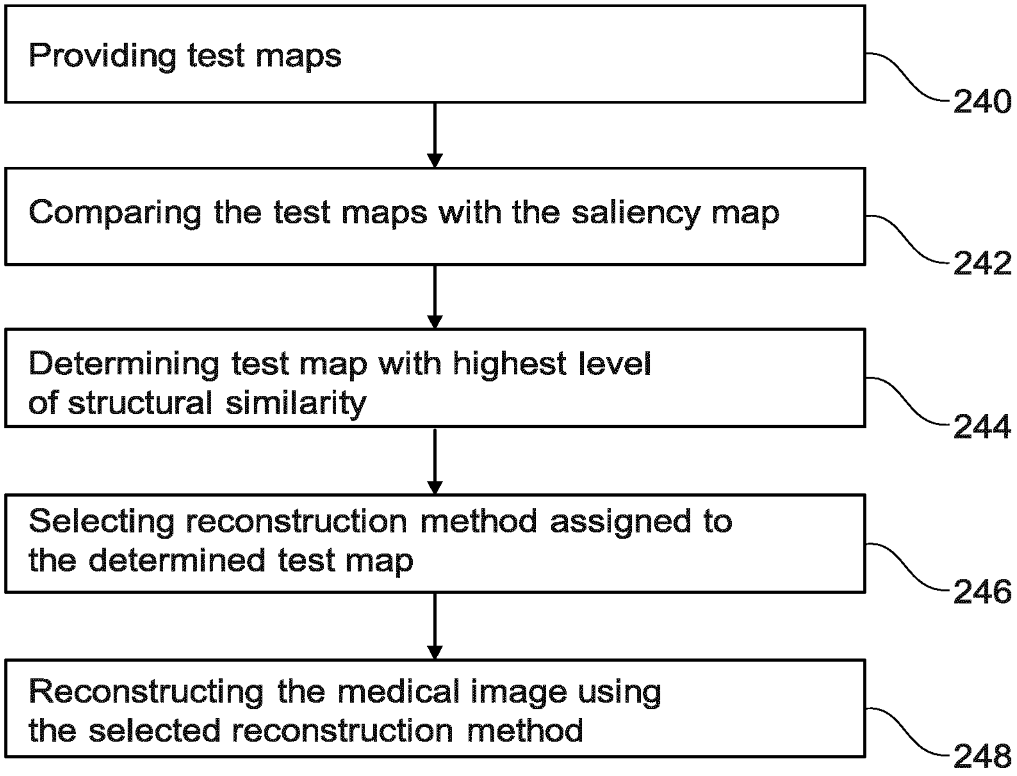
FIG. 13 shows a flow chart which illustrates an exemplary method of selecting a reconstruction method using a saliency map.

FIG. 13 shows a flow chart which illustrates an exemplary method of selecting a reconstruction method using a saliency map. The medical system executing the method may be configured to select a reconstruction method for reconstructing medical images from a plurality of pre-defined reconstruction methods using a saliency map. In block 240, a plurality of test maps for a test medical image is provided. The test medical image is medical image of a pre-defined type of anatomical structure for which a medical image is to be reconstructed. Each of the test maps is assigned to a different one of the reconstruction methods. Each of the test maps identifies sections of the test image comprising anatomical sub-structures of the pre-defined type of anatomical structure for which a quality of image reconstruction is the highest compared to other anatomical sub-structures of the pre-defined type of anatomical structure, when using the assigned reconstruction method. In block 242, the test maps are compared with the saliency map. The saliency map is a saliency map predicted for the test medical image, i.e., the saliency map predicts a distribution of user attention over the test medical image. In block 244, it is determined which one of the test maps has a highest level of structural similarity with the saliency map. In block 246, the reconstruction method assigned to the determined test map is selected for reconstructing the medical image to be reconstructed. In block 246, the medical image to be reconstructed is reconstructed using the selected reconstruction method.

Thus, the trained machine learning module may be used to select a reconstruction method that better serves the interests of a user. By providing a saliency map that predicts a distribution of user attention, the trained machine learning provides an approach taking into account a user related measure of relevance. In this setting, multiple reconstruction methods with comparable characteristics may be deployed. For example, a specific anatomical structure should be depicted. Comparable characteristics may refer to the fact that all the reconstruction methods are able to provide reconstruct medical images depicting the respective anatomical structure. The reconstruction method most suitable for the user may be chosen based on the prediction of user attention provided by the saliency map. The saliency map may, e.g., predict a distribution of user attention for an individual user. Thus, for different users different saliency maps may be predicted, depending on user's experience, references and/or way of working. Different radiologists may examine images in different ways. Hence, each of them may benefit from reconstructions which better meet his or her individual needs. Each of the reconstruction methods may be designed to deal with particular characteristic of the input data, i.e., of the acquired medical data used for reconstructing the medical image. For example, in MRI, some reconstruction methods may produce medical images having a high contrast between white and gray matter in the brain, while others may provide better signal-to-noise ratio in regions near the skull. For each reconstruction method a test map may be provided identifying sections of a test image for which a quality of image reconstruction of the respective reconstruction method is the highest. For example, in case of a reconstruction method providing high image quality for white matter in the brain a test map may be provided highlighting white matter comprised by the test image. For example, in case of a reconstruction method providing high image quality for grey matter in the brain a test map may be provided highlighting grey matter comprised by the test image. For example, in case of a reconstruction method providing high image quality for cerebrospinal fluid in the brain a test map may be provided highlighting cerebrospinal fluid comprised by the test image. The test maps may have saliency map-like appearance. The test maps may be compared with the saliency map provided by the machine learning, that, e.g., is configured to predict a particular radiologists' distribution of attention over the test image. The most suitable reconstruction method, i.e., the reconstruction method for which the test map displays a highest level of similarity with the saliency map is chosen. The level of similarity may be determined estimating a distance between the saliency map obtained for the radiologist and the test maps provided for the different reconstruction method.

Figure 14:
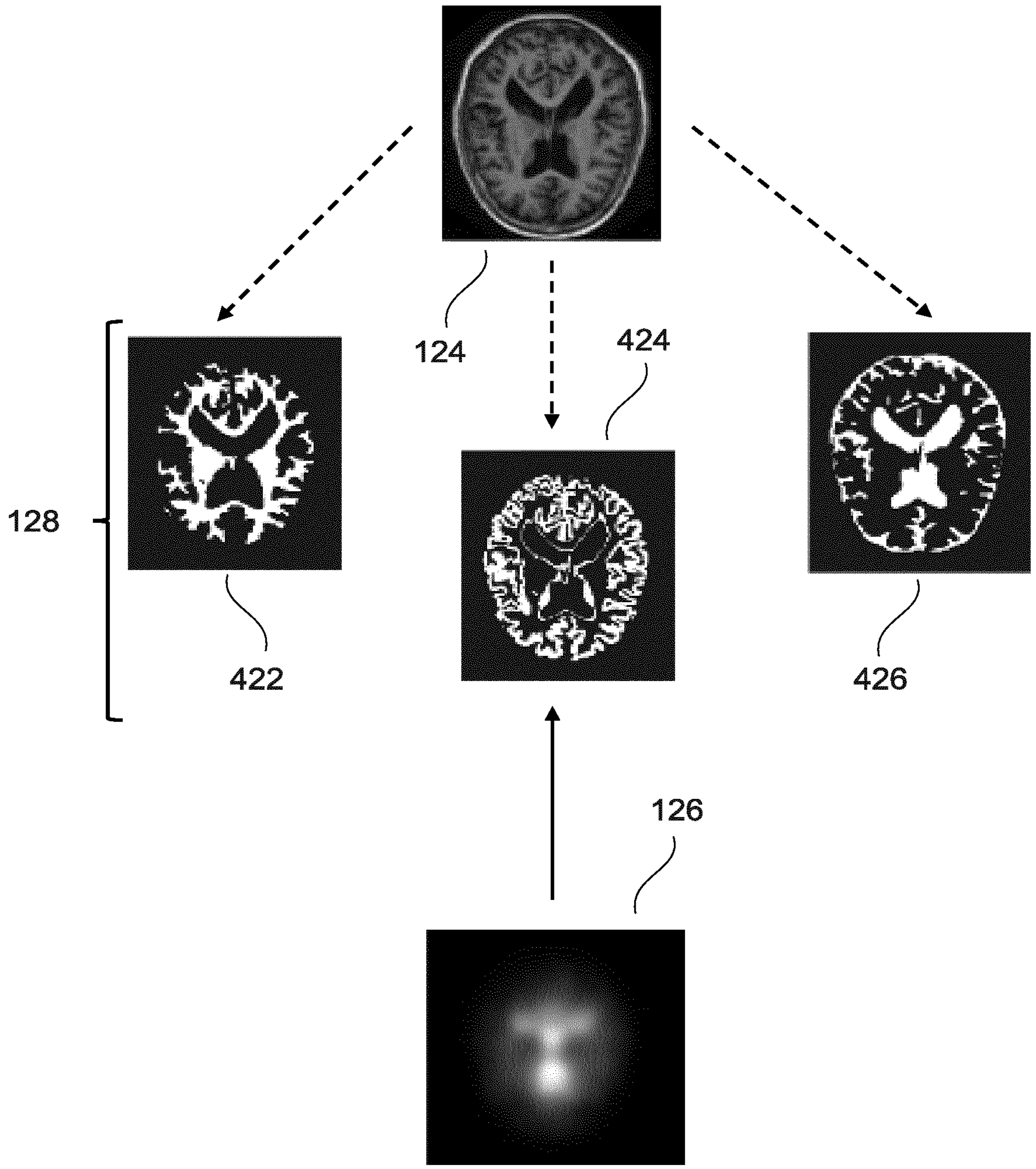
FIG. 14 illustrates an exemplary method of selecting a reconstruction method using a saliency map.

FIG. 14 illustrates an exemplary method of selecting a reconstruction method using a saliency map. For example, a medical image of the brain is to be reconstructed. A medical image 124 of the brain may be provided as the test image, for which test maps 128 assigned to different reconstruction methods are provided. In this example, there are three available reconstruction methods, each of which may have its own strength in reconstructing different parts of the brain. For example, a first one of the reconstruction methods may have its strength in reconstructing white matter in the brain. A second one of the reconstruction methods may have its strength in reconstructing grey matter in the brain, while a third one of the reconstruction methods may have its strength in reconstructing cerebrospinal fluid. For each of the reconstruction methods a test map may be provided highlighting regions of the test image for which a reconstruction quality of the respective reconstruction method is the highest. For example, for the first reconstruction method a test map 422 may be provided highlighting white matter comprised by the test image. For example, for the second reconstruction method a test map 424 may be provided highlighting grey matter comprised by the test image, while for the third reconstruction method a test map 426 may be provided highlighting cerebrospinal fluid. Furthermore, a saliency map 126 predicting a distribution of user attention over the test medical image 124 is generated using a trained machine learning module, e.g., user-specific trained machine learning module. The trained machine learning module may, e.g., be a deep learning neural network. In this case, e.g., the second reconstruction method may be selected, because the test map 424 highlighting the gray matter comprised by the test image 124 best matches the distribution of user attention predicted by the saliency map 126 for the medical test image 124 of the brain. Thus, the user is predicted to mostly focus on gray matter. Hence, the model that works best on gray matter may be chosen as the model best fitting the user's needs.

Figure 15:
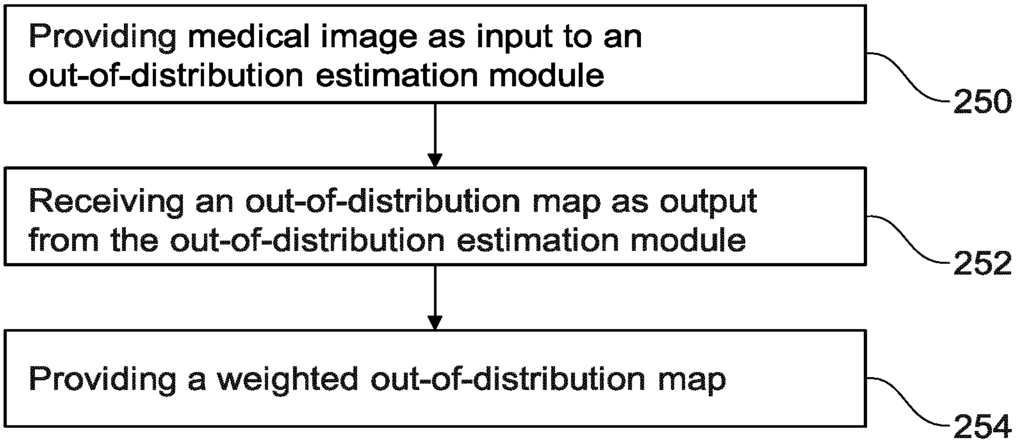
FIG. 15 shows a flow chart which illustrates an exemplary method of providing a weighted OOD map using a saliency map.

FIG. 15 shows a flow chart which illustrates an exemplary method of providing a weighted OOD map using a saliency map. A medical system executing the method may comprise an OOD estimation module configured for outputting an OOD map in response to receiving a medical image as input. The OOD map represents levels of compliance of the input medical image with a reference distribution defined by a set of reference medical images. In block 250, the medical image is provided as input to the OOD estimation module. In block 252, an OOD map of the medical image is received as output from the OOD estimation module in response to the providing of the medical image. The OOD map represents levels of compliance of the medical image with the pre-defined distribution. In block 254, a weighted OOD map is provided. The providing of the weighted OOD map may comprise weighting the levels of compliance represented by the OOD map received in block 252 using the distribution of user attention over the medical image predicted by the saliency map.

Figure 16:
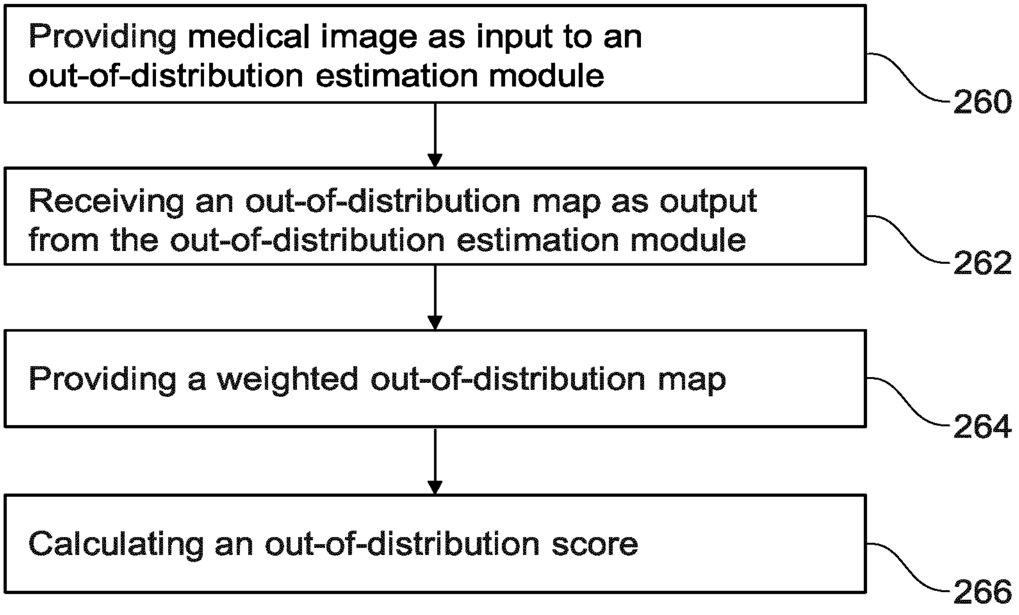
FIG. 16 shows a flow chart which illustrates an exemplary method of providing a weighted OOD score using a saliency map.

FIG. 16 shows a flow chart which illustrates an exemplary method of providing a weighted OOD score using a saliency map. Blocks 260 to 264 of FIG. 16 correspond to blocks 250 to 254 of FIG. 15. In block 266, an OOD score is calculating using the weighted levels of compliance of the weighted OOD map provided in block 264. The OOD score is descriptive of a probability that the medical image as a whole is within the reference distribution.

Figure 17:
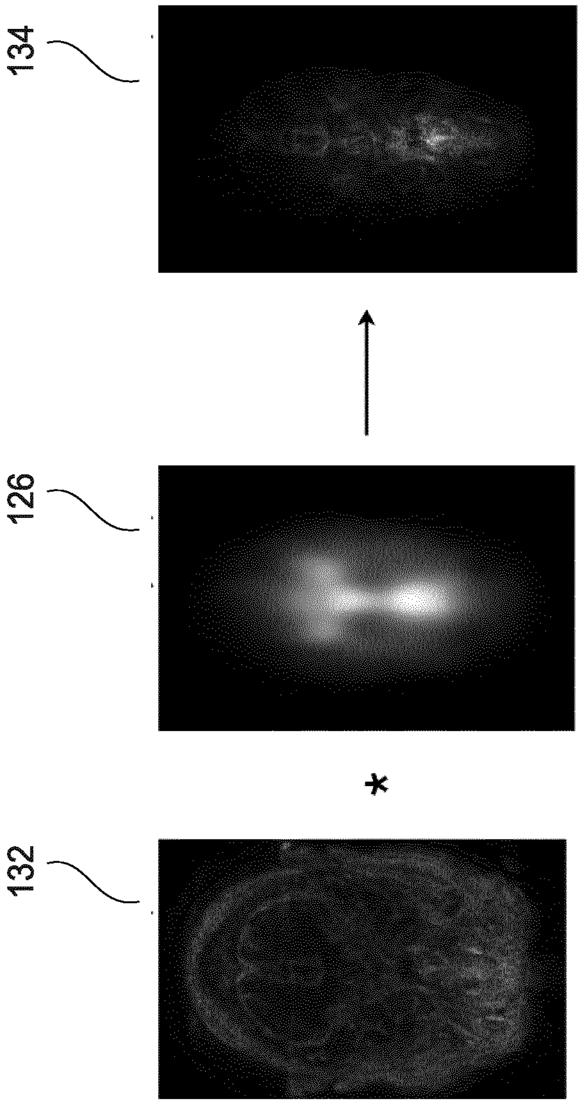
FIG. 17 shows a flow chart which illustrates an exemplary method of providing a weighted OOD map using a saliency map.

FIG. 17 shows a flow chart which illustrates an exemplary method of providing a weighted OOD map 134 using a saliency map 126. The saliency map 126 is used for scaling of an OOD map 132 resulting in the weighted OOD map 134. The ODD map 132 is generated for the same medical image, for which the saliency map 126 is provided. The OOD map 132 provides a distribution of OOD values, i.e., levels of uncertainty, over the medical image. The saliency map 126 predicts a distribution of user attention and thus relevance over the medical image. The scaled OOD map 134 looks rather empty, since regions with the highest OOD score indicated by the OOD map 132 appear to be the least important for a user according to the user attention indicated by the saliency map 126. Thus, such a medical image may still be reliable, even though it may comprise uncertainties, since the uncertainties are restricted to rather unimportant regions of the medical image.

Figure 18:
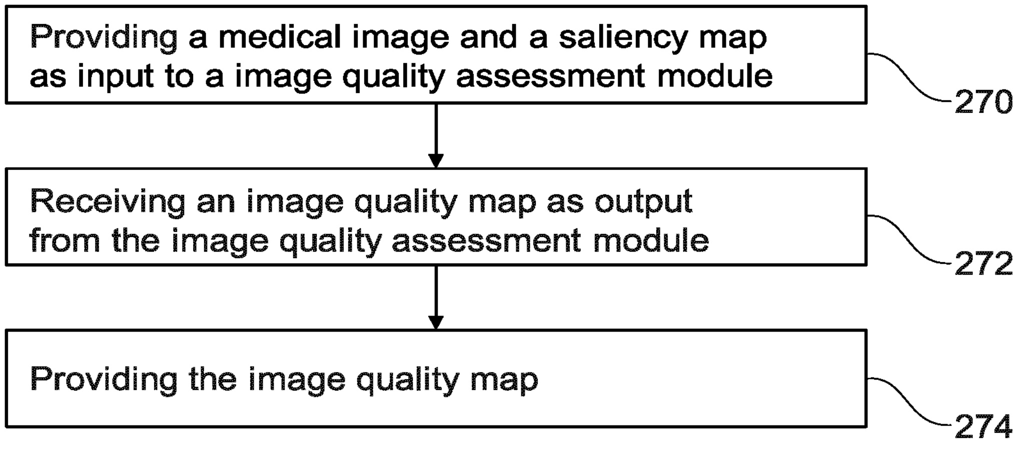
FIG. 18 shows a flow chart which illustrates an exemplary method of providing an image quality map using a saliency map.

FIG. 18 shows a flow chart which illustrates an exemplary method of providing an image quality map using a saliency map. The medical system used to execute the method may comprise an image quality assessment module configured for outputting an image quality map in response to receiving a medical image and a saliency map as input. The image quality map represents a distribution of levels of image quality over the input medical image weighted using a distribution of user attention over the input medical image predicted by the input saliency map. In block 270, a medical image and a saliency map are provided as input to the image quality assessment module. In block 272, an image quality map is received as output from the image quality assessment module in response to the providing of the medical image and the saliency map. The image quality map represents a distribution of levels of image quality over the medical image weighted using the distribution of user attention over the medical image predicted by the saliency map. In block 274, the computational system provides the received image quality map. The image quality map may, e.g., be used as a weighted loss function for training a machine learning module to reconstruct medical images.

Figure 19:
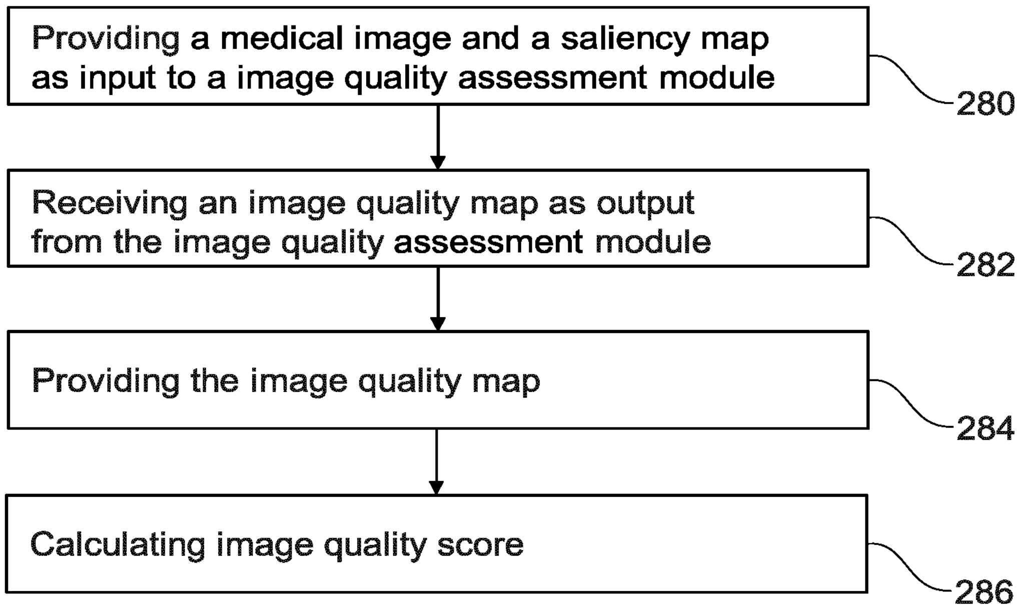
FIG. 19 shows a flow chart which illustrates an exemplary method of providing an image quality score using a saliency map.

FIG. 19 shows a flow chart which illustrates an exemplary method of providing an image quality score using a saliency map. Blocks 280 to 284 of FIG. 19 correspond to blocks 270 to 274 of FIG. 18. In block 286, an image quality score is calculated using the received image quality map. The image quality score may be descriptive of an averaged image quality of the medical image.

Figure 20:
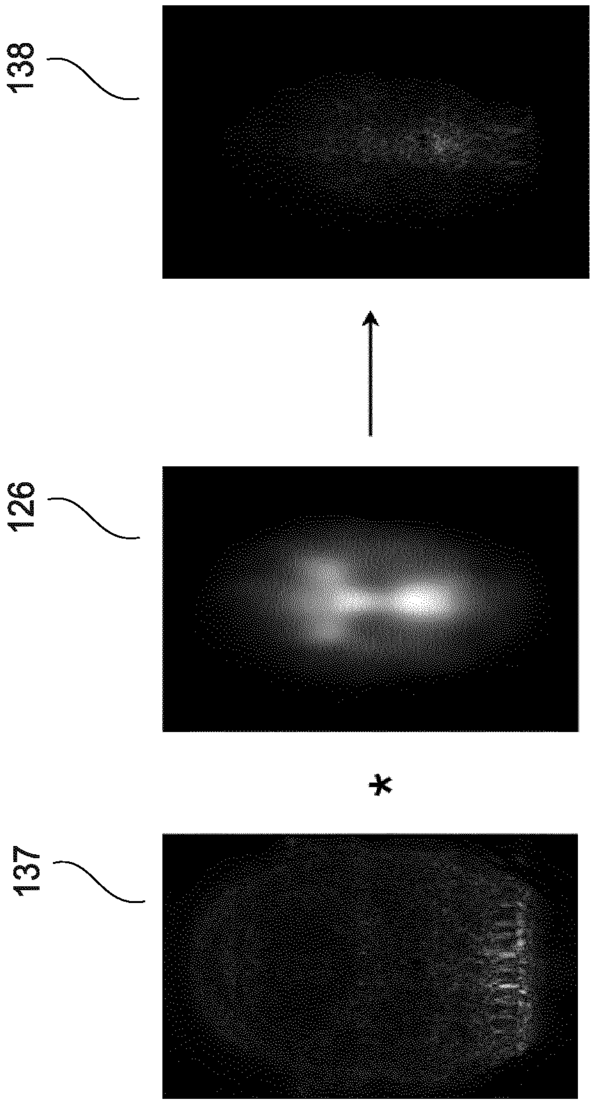
FIG. 20 shows a flow chart which illustrates an exemplary method of providing an image quality map using a saliency map.

FIG. 20 shows a flow chart which illustrates an exemplary method of providing an image quality map, e.g., providing a weighted reconstruction error for MSE metric, using a saliency map. An image quality map 137, i.e., an error map of a distribution of a reconstruction error measure over a medical image is scaled using a saliency map 126. As a reconstruction error measure, e.g., a MSE metric may be used. The values of the reconstruction errors for the MSE metric are weighted using a distribution of user attention predicted by the saliency map 126. The scaled image quality map 138 shows that a neural network being trained may need to be penalized in a very different way in order to produce images that meet a user's needs determined based on predicted user attention. Without the scaling, the neural network being trained is panelized for errors occurring in the brighter regions of image quality map 137, which significantly differ from the regions highlighted in the weighted image quality map 138. The regions highlighted image quality map 138 are the regions important for the user. Thus, using the image quality map 137 to adjust parameters of the neural network being trained may improve the overall image quality of the image being reconstructed by the neural network, however the improvement may be negligible for the regions important for the user. In order to improve the image quality such that the user really benefits, using a weighted image quality map such as map 138 may be required.

Figure 21:
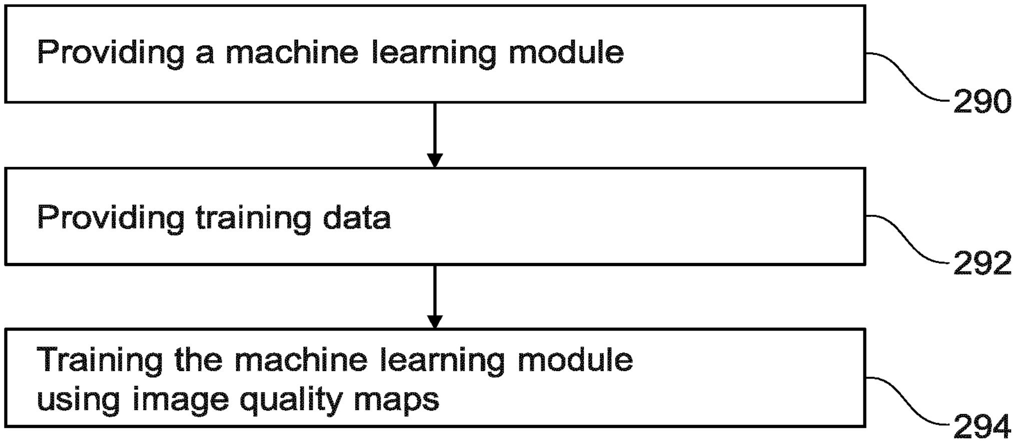
FIG. 21 shows a flow chart which illustrates an exemplary method of training a machine learning module to reconstruct medical images using saliency maps.

FIG. 21 shows a flow chart which illustrates an exemplary method of training a machine learning module to reconstruct medical images using saliency maps. The image quality assessment module providing the image quality maps weighted using a saliency map as shown, e.g., in FIGS. 18 and 20, may be used for training a machine learning module to output in response to receiving medical imaging data as input a medical image as output. The image quality estimated by the image quality assessment module may be descriptive of losses of the output medical image of the machine learning module being trained relative to one or more reference medical images. In block 290, the machine learning module to be trained may be provided. In block 292, training data for training the machine learning module is provided. The training data comprises pairs of training medical imaging data and training medical images reconstructed using the training medical imaging data. In block 294, machine learning module is trained using the training data as well as image quality maps. The machine learning module is trained to output the training medical images of the pairs in response to receiving the training medical imaging data of the pairs. The training comprises for each of the pairs providing the respective training medical imaging data as input to the machine learning module and receiving a preliminary medical image as output. For the preliminary medical image an image quality map is generated weighted by a saliency map predicted for the preliminary medical image. The distribution of image quality represented by the image quality map received for the preliminary medical image from the image quality assessment module is used as a distribution of losses over the preliminary medical image relative to the training medical image of the respective pair provided as a reference medical image to the image quality assessment module for determining the received image quality map. Parameters of the machine learning module are adjusted during the training until the losses over the medical image satisfy a predefined criterion. The criterion may, e.g., require the losses to be equal or smaller than a threshold.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

Reference Signs List

100 medical system
101 medical system
102 computer
104 computational system
106 optional hardware interface
108 optional user interface
110 memory
120 machine executable instructions
121 machine learning module
122 trained machine learning module
123 medical imaging data
124 medical image
126 saliency map
128 set of test maps
130 OOD estimation module
132 OOD map
134 weighted OOD map
136 image quality assessment module
138 image quality map
140 display device
144 eye tracking device
150 attention determining module
160 machine learning module
162 training data
302 magnetic resonance imaging system
304 magnet
306 bore of magnet
308 imaging zone
309 region of interest
310 magnetic field gradient coils
312 magnetic field gradient coil power supply
314 radio-frequency coil
318 transceiver
318 subject
320 subject support
330 pulse sequence commands
332 CT system
334 X-ray power supply
336 gantry
338 voltage stabilizer circuit
340 axis of rotation
342 X-ray tube
344 detector
346 X-rays
350 CT control commands
406 training medical image
407 training data
408 training saliency map
422 test map
424 test map
426 test map
500 user
502 eyes

The invention claimed is:

1. A medical system comprising:

a computational system and a memory configured to store machine executable instructions, wherein the memory further stores a trained first machine learning module trained to output in response to receiving a medical image as input a saliency map as output, the saliency map being predictive of a distribution of user attention over the medical image;

wherein execution of the machine executable instructions causes the computational system to:

receive a medical image, wherein the medical image is a test medical image of a pre-defined type of anatomical structure for which the medical image is to be reconstructed, wherein a plurality of test maps is provided, each of the test maps being assigned to a different one of the reconstruction methods, each of the test maps identifying sections of the test image comprising anatomical sub-structures of the predefined type of anatomical structure for which a quality of image reconstruction is the highest compared to other anatomical sub-structures of the predefined type of anatomical structure, when using the assigned reconstruction method;

provide the medical image as input to the trained first machine learning module;

in response to the providing of the medical image, receive a saliency map of the medical image as output from the trained first machine learning module, wherein the saliency map predicts a distribution of user attention over the medical image;

compare the test maps with the saliency map;

determine one of the test maps having a highest level of structural similarity with the saliency map;

select the reconstruction method assigned to the determined test map; and reconstruct the medical image using the selected reconstruction method.

2. The medical system of claim 1, wherein execution of the machine executable instructions further causes the computational system to provide the trained first machine learning module, wherein the providing of the trained first machine learning module comprises:

providing the first machine learning module;

providing first training data comprising first pairs of training medical images and training saliency maps, wherein the training salient maps are descriptive of distributions of user attention over the training medical images;

training the first machine learning module using the first training data, wherein the resulting trained first machine learning module is trained to output the training saliency maps of the first pairs in response to receiving the training medical images of the first pairs.

3. The medical system of claim 2, wherein the medical system further comprises a display device, wherein the providing of the first training data comprises for each of the training medical images of the first training data:

displaying the respective training medical image using the display device;

measuring a distribution of user attention over the displayed training medical image;

generating the training saliency map of the first pair of training data comprising the displayed training medical image using the measured distribution of user attention over the training medical image.

4. The medical system of claim 3, wherein the medical system further comprises an eye tracking device configured for measuring positions and movements of eyes of a user of the medical system, wherein the memory further stores an attention determining module configured for determining the distribution of user attention over the displayed training medical image using the eye tracking device to determine for the user of the medical system looking at the displayed training medical image points of attention within the displayed training medical image.

5. The medical system of claim 1, wherein the trained first machine learning module is trained to output in response to receiving a medical image as input a user individual saliency map predicting a user individual distribution of user attention over the input medical image.

6. The medical system of claim 1, wherein the medical system is configured to acquire medical imaging data for reconstructing the medical image, wherein the medical imaging data is acquired using any one of the following data acquisition methods: magnetic resonance imaging, computed-tomography imaging, positron emission tomography imaging, single photon emission computed tomography imaging.

7. A medical system comprising:

a computational system; and a memory configured to store machine executable instructions, wherein the memory stores:

a trained first machine learning module trained to output in response to receiving a medical image as input a saliency map as output, the saliency map being predictive of a distribution of user attention over the medical image; and an out-of-distribution estimation module configured to output an out-of-distribution map in response to receiving a medical image as input, wherein the out-of-distribution map represents levels of compliance of the input medical image with a reference distribution defined by a set of reference medical images, wherein execution of the machine executable instructions causes the computational system to:

receive a medical image, wherein the medical image is a test medical image of a pre-defined type of anatomical structure for which the medical image is to be reconstructed, wherein a plurality of test maps is provided, each of the test maps being assigned to a different one of the reconstruction methods, each of the test maps identifying sections of the test image comprising anatomical sub-structures of the predefined type of anatomical structure for which a quality of image reconstruction is the highest compared to other anatomical sub-structures of the predefined type of anatomical structure when using the assigned reconstruction method;

in response to the providing of the medical image, receive a saliency map of the medical image as output from the trained first machine learning module, wherein the saliency map predicts a distribution of user attention over the medical image;

provide the saliency map of the medical image;

compare the test maps with the saliency map;

determine one of the test maps having a highest level of structural similarity with the saliency map;

select the reconstruction method assigned to the determined test map; and reconstruct the medical image using the selected reconstruction method, provide the medical image as input to the out-of-distribution estimation module;

in response to the providing of the medical image, receive an out-of-distribution map of the medical image as output from the out-of-distribution estimation module, wherein the out-of-distribution map represents levels of compliance of the medical image with the reference distribution; and provide a weighted out-of-distribution map, wherein the providing of the weighted out-of-distribution map comprises weighting the levels of compliance represented by the out-of-distribution map using the distribution of user attention over the medical image predicted by the saliency map.

8. The medical system of claim 7, wherein the providing of the weighted out-of-distribution map further comprises calculating an out-of-distribution score using the weighted levels of compliance provided by the weighted out-of-distribution map, wherein the out-of-distribution score is descriptive of a probability that the medical image as a whole is within the reference distribution.

9. A medical system comprising:

a computational system; and and a memory configured to store machine executable instructions, wherein the memory stores:

a trained first machine learning module trained to output in response to receiving a medical image as input a saliency map as output, the saliency map being predictive of a distribution of user attention over the medical image, and an image quality assessment module configured to output an image quality map in response to receiving a medical image and a saliency map as input, wherein the image quality map represents a distribution of levels of image quality over the input medical image weighted using the distribution of user attention over the input medical image predicted by the input saliency map;

wherein execution of the machine executable instructions causes the computational system to:

receive a medical image, wherein the medical image is a test medical image of a pre-defined type of anatomical structure for which the medical image is to be reconstructed, wherein a plurality of test maps is provided, each of the test maps being assigned to a different one of the reconstruction methods, each of the test maps identifying sections of the test image comprising anatomical sub-structures of the pre-defined type of anatomical structure for which a quality of image reconstruction is the highest compared to other anatomical sub-structures of the pre-defined type of anatomical structure, when using the assigned reconstruction method;

provide the medical image as input to the trained first machine learning module;

in response to the providing of the medical image, receive a saliency map of the medical image as output from the trained first machine learning module, wherein the saliency map predicts a distribution of user attention over the medical image;

provide the saliency map of the medical image;

compare the test maps with the saliency map;

determine one of the test maps having a highest level of structural similarity with the saliency map;

select the reconstruction method assigned to the determined test map;

reconstruct the medical image using the selected reconstruction method;

provide the medical image and the saliency map as input to the image quality assessment module;

in response to the providing of the medical image and the saliency map, receive an image quality map as output from the image quality assessment module, wherein the image quality map represents a distribution of levels of image quality over the medical image weighted using the distribution of user attention over the medical image predicted by the saliency map; and provide the received image quality map.

10. The medical system of claim 9, wherein the image quality assessment module is used for training a second machine learning module to output in response to receiving medical imaging data as input a medical image as output, wherein the image quality estimated by the image quality assessment module is descriptive of losses of the output medical image of the second machine learning module relative to one or more reference medical images, wherein execution of the machine executable instructions further causes the computational system to:

provide the second machine learning module;

provide second training data for training the second machine learning module, the second training data comprising second pairs of training medical imaging data and training medical images reconstructed using the training medical images data;

train the second machine learning module, wherein the second machine learning module is trained to output the training medical images of the second pairs in response to receiving the training medical images data of the second pairs, wherein the training comprises for each of the second pairs providing the respective training medical imaging data as input to the second machine learning module and receiving a preliminary medical image as output, wherein the received preliminary medical image is the medical image, wherein the distribution of image quality represented by the image quality map received for the medical image from the image quality assessment module is used as a distribution of losses over the medical image relative to the training medical image of the respective second pair provided as a reference medical image to the image quality assessment module for determining the received image quality map, wherein parameters of the second machine learning module are adjusted during the training until the losses over the medical image satisfy a predefined criterium.

11. The medical system of claim 9, wherein the providing of the received image quality map comprises calculating an image quality score using the received image quality map, wherein the image quality score is descriptive of an averaged image quality of the medical image.

12. A method of reconstructing medical images using a trained machine learning module, the method comprising:

receive a medical image, wherein the medical image is a test medical image of a pre-defined type of anatomical structure for which the medical image is to be reconstructed, wherein a plurality of test maps is provided, each of the test maps being assigned to a different one of the reconstruction methods, each of the test maps identifying sections of the test image comprising anatomical sub-structures of the pre-defined type of anatomical structure for which a quality of image reconstruction is the highest compared to other anatomical sub-structures of the pre-defined type of anatomical structure, when using the assigned reconstruction method;

provide the medical image as input to the trained first machine learning module;

in response to the providing of the medical image, receive a saliency map of the medical image as output from the trained first machine learning module, wherein the saliency map predicts a distribution of user attention over the medical image;

compare the test maps with the saliency map;

determine one of the test maps having a highest level of structural similarity with the saliency map; and select the reconstruction method assigned to the determined test map; and reconstruct the medical image using the selected reconstruction method.

13. A computer program comprising machine executable instructions stored on a non-transitory computer readable medium, wherein execution of the machine executable instructions causes a computational system to perform a method according to claim 12.

* * * * *